United States Patent
Kimura

(10) Patent No.: US 6,811,129 B2
(45) Date of Patent: Nov. 2, 2004

(54) FIXTURE DEVICE

(75) Inventor: Satoru Kimura, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 137 days.

(21) Appl. No.: 10/111,352

(22) PCT Filed: Aug. 16, 2001

(86) PCT No.: PCT/JP01/07071

§ 371 (c)(1),
(2), (4) Date: Apr. 22, 2002

(87) PCT Pub. No.: WO02/16199

PCT Pub. Date: Feb. 28, 2002

(65) Prior Publication Data

US 2002/0162930 A1 Nov. 7, 2002

(30) Foreign Application Priority Data

Aug. 22, 2000 (JP) .......................... 2000-251353
Aug. 31, 2000 (JP) .......................... 2000-263829
Aug. 31, 2000 (JP) .......................... 2000-263830

(51) Int. Cl.[7] .............................. A47B 96/00; B60N 3/12
(52) U.S. Cl. ................ 248/221.11; 248/917; 296/37.7; 348/837
(58) Field of Search .................... 248/221.11, 919–920, 248/917, 918, 309.1, 341, 322, 222.12; 296/37.7, 37.8; 348/837; 345/156; 224/311; 361/681, 682

(56) References Cited

U.S. PATENT DOCUMENTS

| 5,012,625 A | | 5/1991 | Propst |
| 5,144,290 A | * | 9/1992 | Honda et al. ................ 345/156 |
| 5,450,734 A | * | 9/1995 | Esaki et al. .................... 70/208 |
| 5,583,735 A | | 12/1996 | Pease et al. |
| 5,887,939 A | * | 3/1999 | Yamaguchi et al. ......... 296/210 |
| 5,946,055 A | * | 8/1999 | Rosen .......................... 348/837 |
| 6,007,036 A | | 12/1999 | Rosen |
| 6,059,255 A | | 5/2000 | Rosen et al. |
| 6,062,623 A | * | 5/2000 | Lemmen ..................... 296/37.8 |
| 6,135,528 A | * | 10/2000 | Sobieski et al. ............ 296/37.7 |
| 6,400,560 B1 | * | 6/2002 | Chian .......................... 361/681 |
| 6,412,848 B1 | * | 7/2002 | Ceccanese et al. ......... 296/37.7 |
| 6,575,528 B2 | * | 6/2003 | Tiesler et al. ................ 296/214 |
| 6,633,347 B2 | * | 10/2003 | Kitazawa ..................... 348/837 |

FOREIGN PATENT DOCUMENTS

| JP | 1-61801 U | 4/1989 |
| JP | 5-554 U | 1/1993 |
| JP | 6-63735 U | 9/1994 |
| JP | 08070480 A | 3/1996 |
| JP | 2000-159197 A | 6/2000 |
| WO | WO 00/44589 A1 | 8/2000 |

* cited by examiner

*Primary Examiner*—Leslie A. Braun
*Assistant Examiner*—Tan Le
(74) *Attorney, Agent, or Firm*—Akin Gump Strauss Hauer & Feld, L.L.P.

(57) ABSTRACT

A fixture device for installing a display apparatus includes a block for installation, to be fixed to a rail provided in a ceiling portion of a vehicle. The block has an installation window in a side portion and a latch hole in the installation window. A fixture block is installed on said display apparatus body. The fixture block includes an arm having a projection section to be inserted into said installation window. A base plate is fixed to said display apparatus and rotatably connected to said arm. A release lever has a cut-and-raised portion serving as a latch that enters said latch hole in the installation window and prevents said projection section from separating from the installation window when said projection section is inserted into the installation window.

3 Claims, 26 Drawing Sheets

FIG. 1
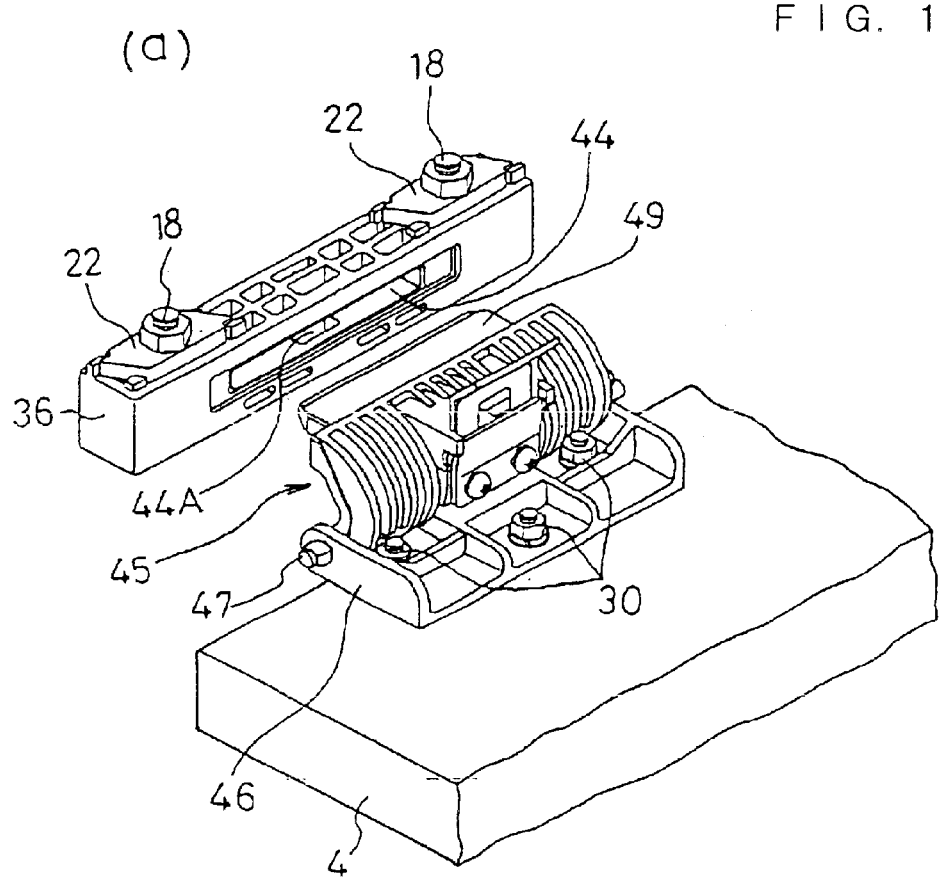
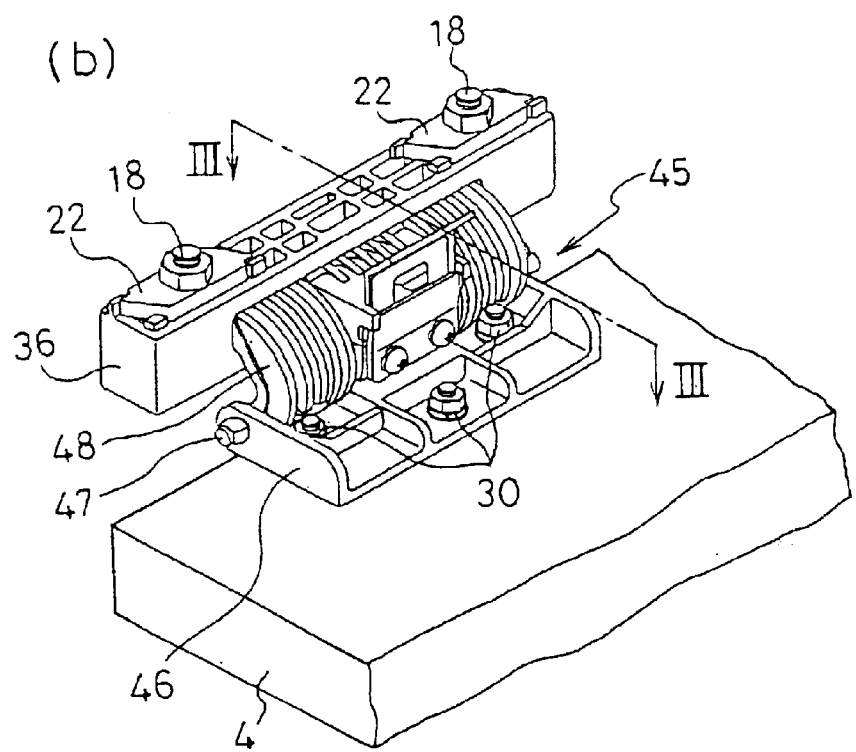

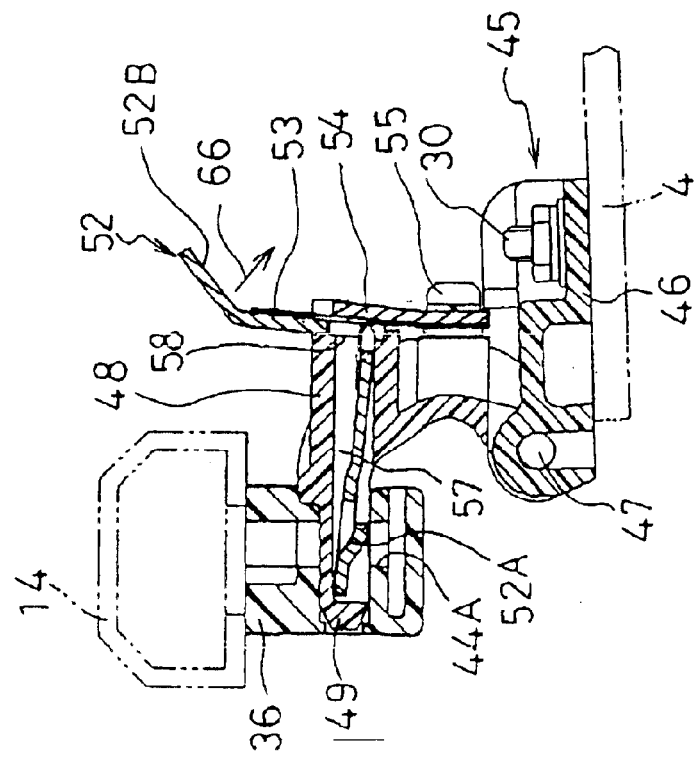
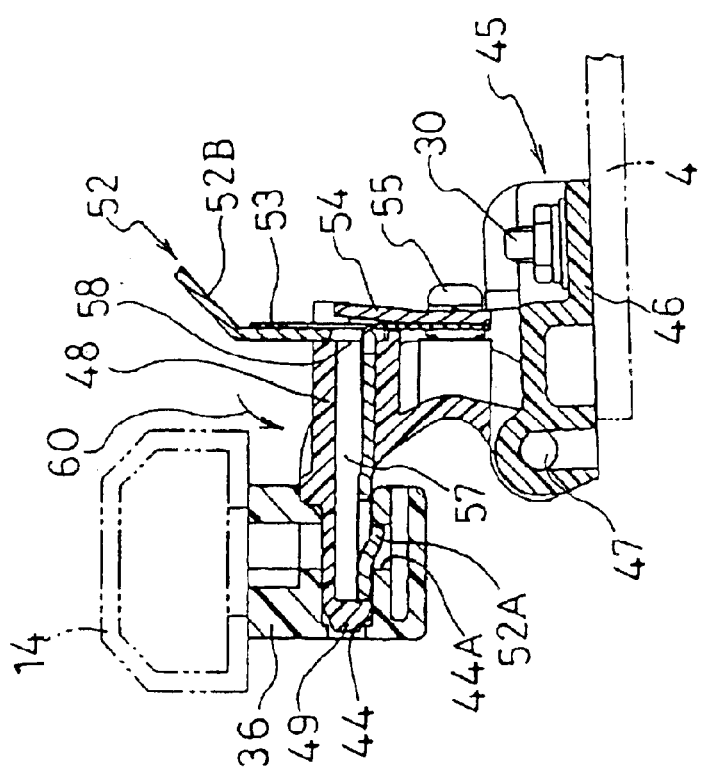
FIG. 3

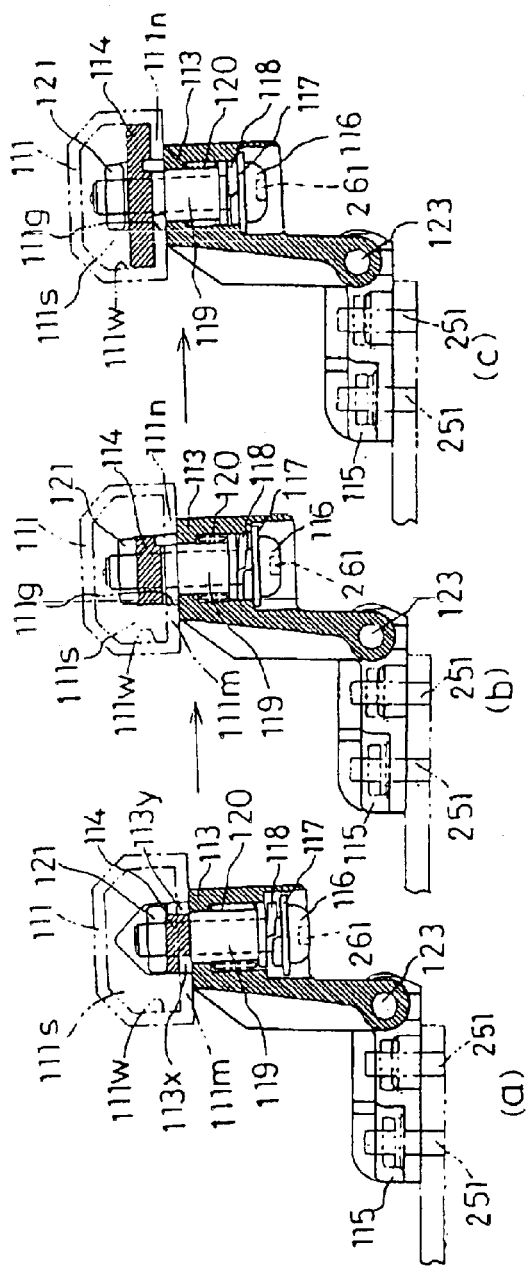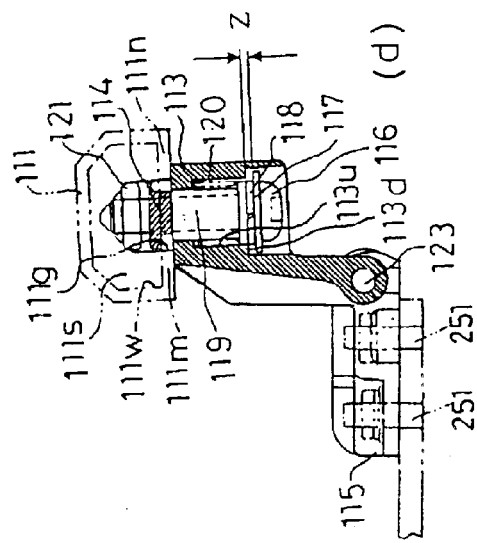
FIG. 7

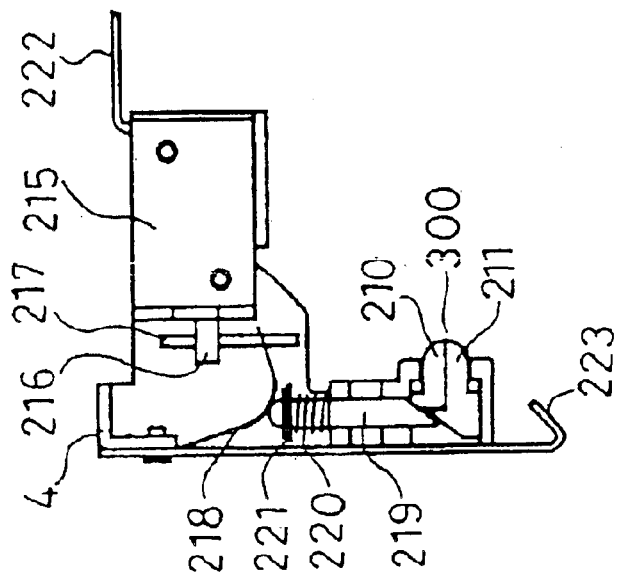
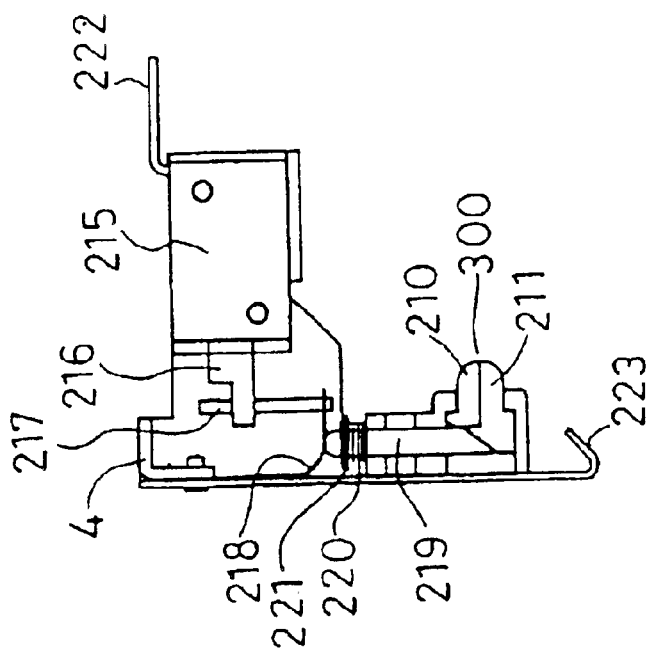
FIG. 11

FIG. 14
(a)
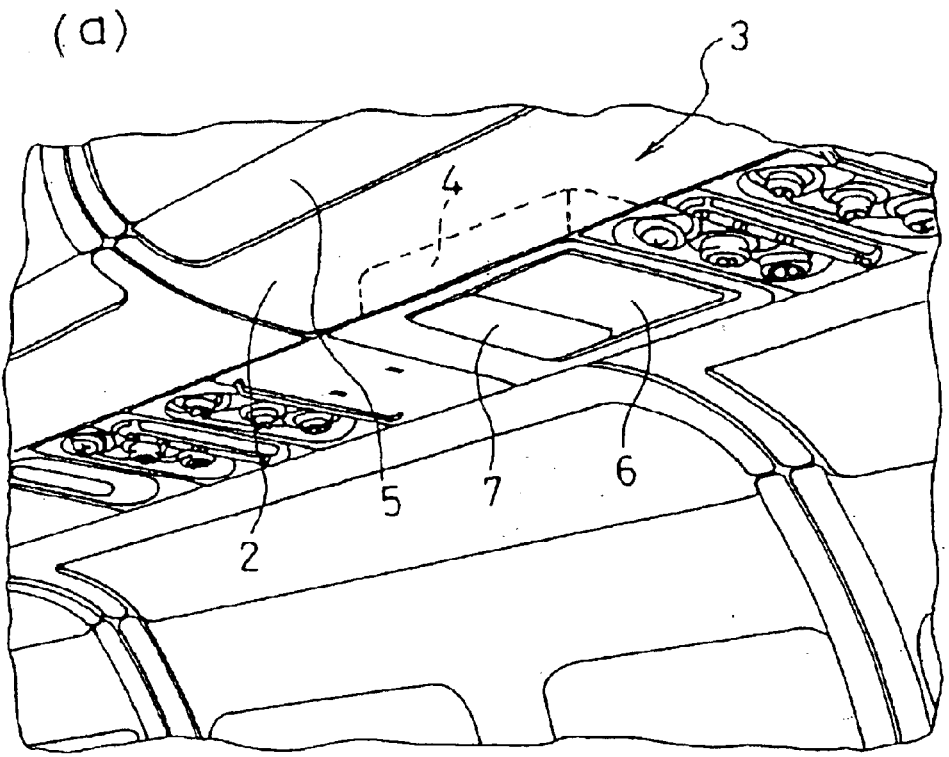
PRIOR ART
(b)
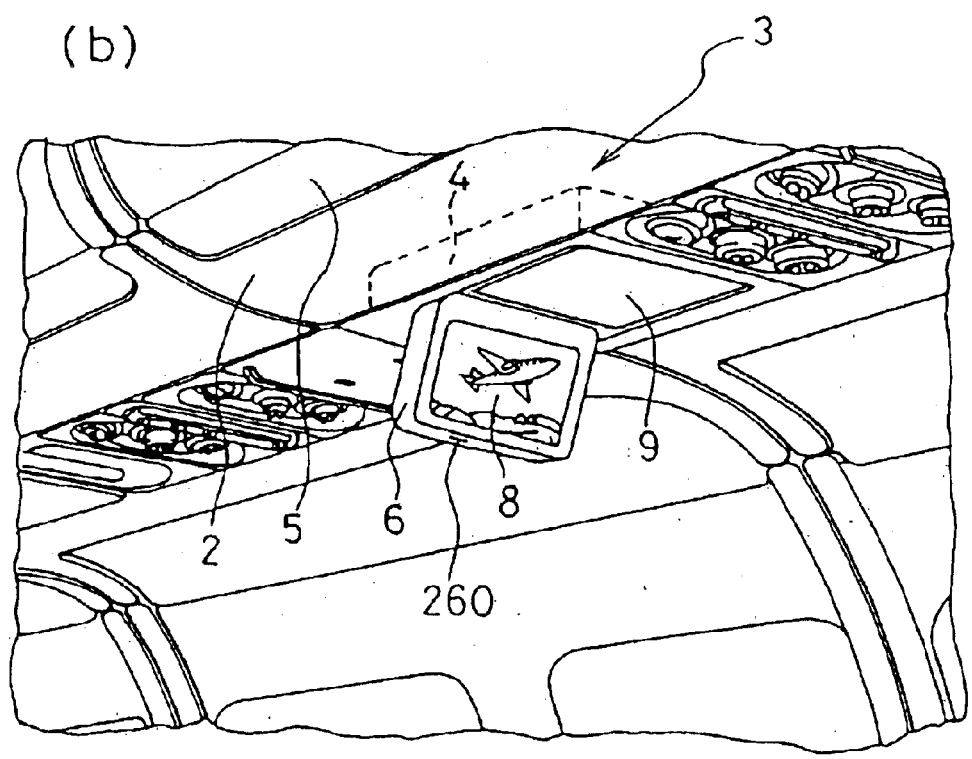

PRIOR ART

FIG. 17
(a)
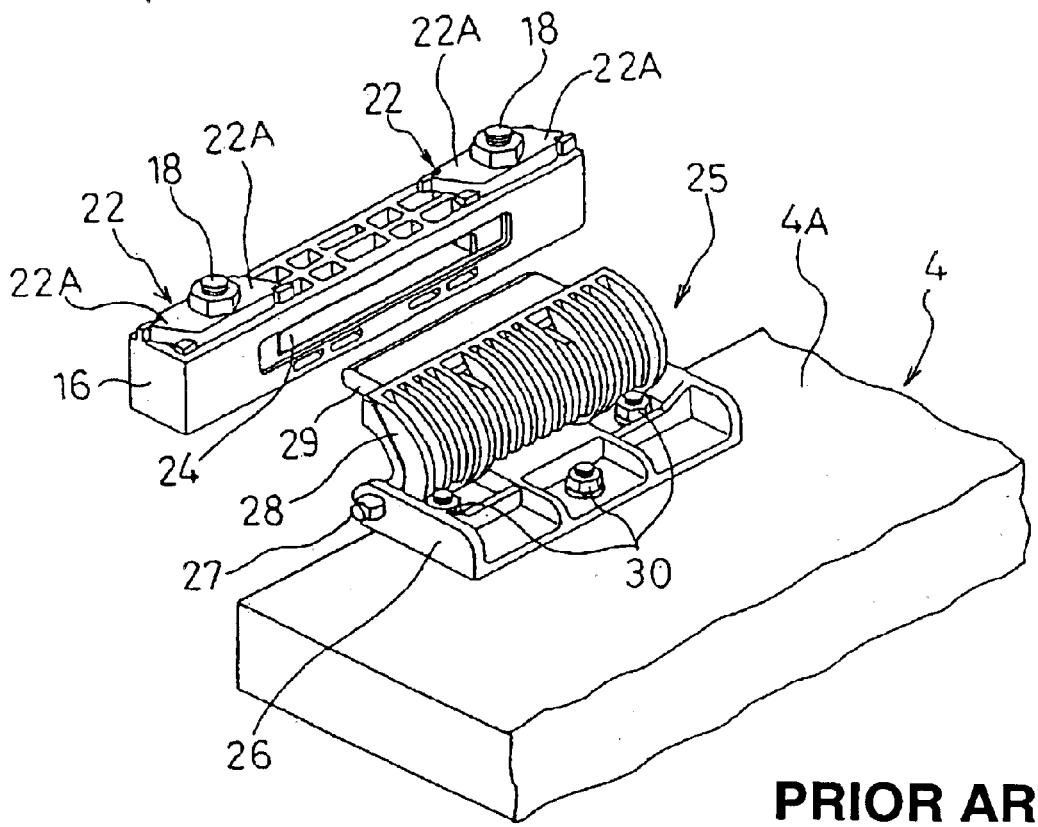
PRIOR ART
(b)
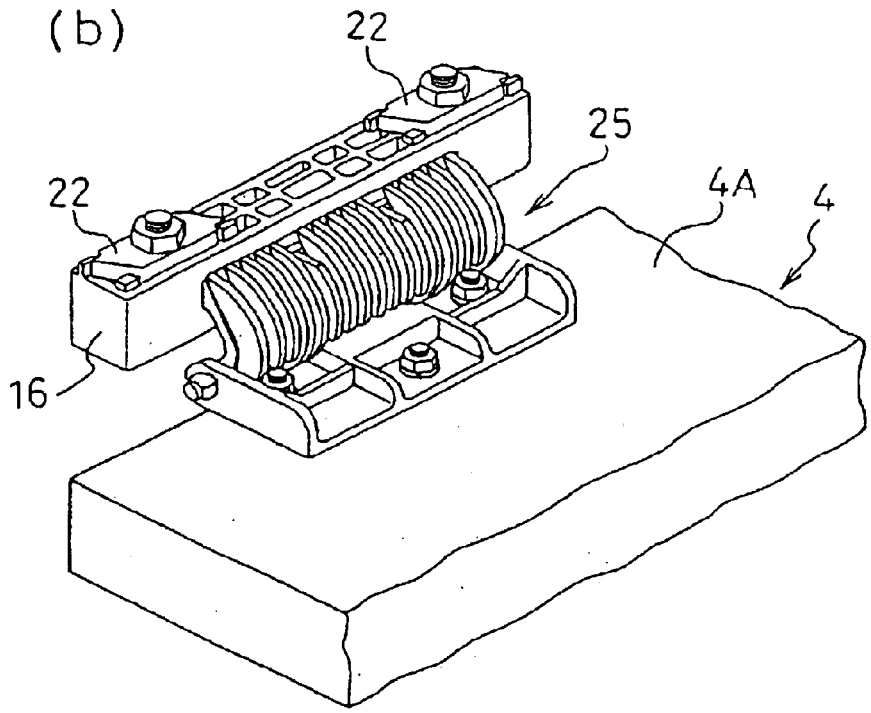

PRIOR ART

FIG. 25
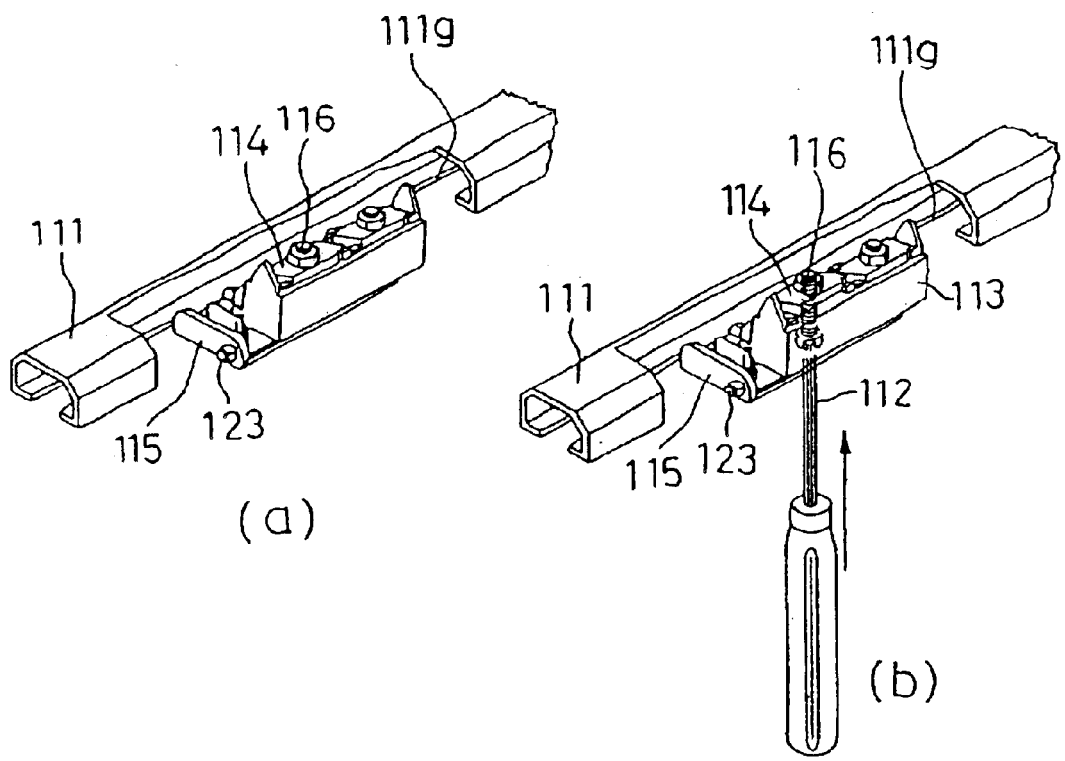
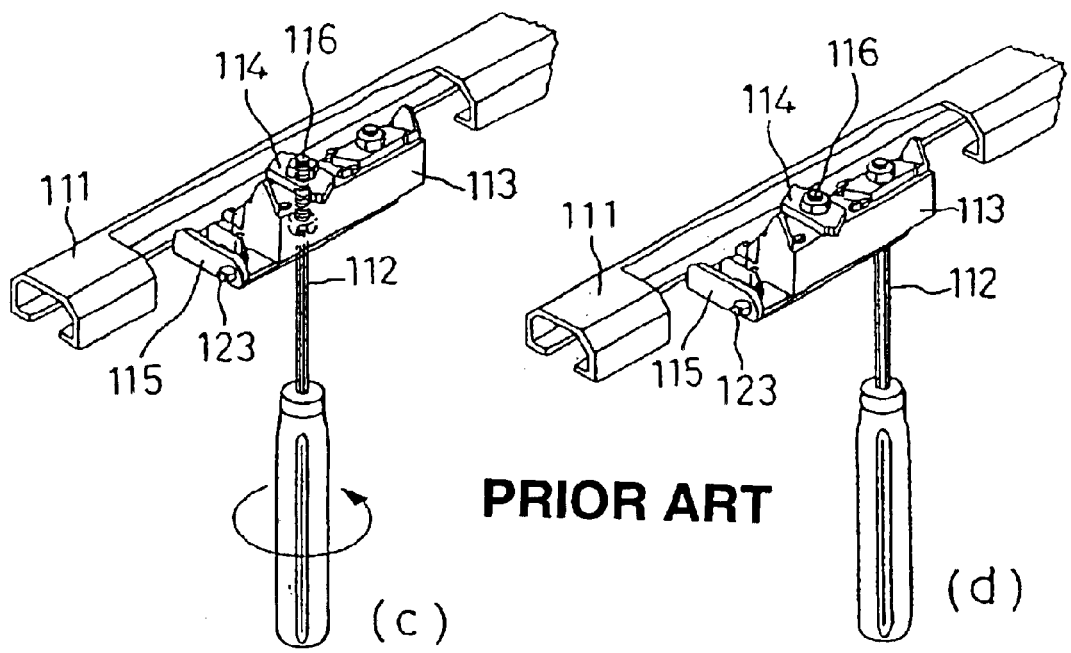
PRIOR ART

FIXTURE DEVICE

CROSS-REFERENCE TO RELATED APPLICATIONS

This application is a Section 371 of International Application No. PCT/JP01/07071 filed on Aug. 16, 2001, the disclosure of which is incorporated herein by reference.

BACKGROUND OF THE INVENTION

1. Technical Field

The present invention relates to a fixture device for fixing a display apparatus on the ceiling portion of a vehicle, such as an aircraft, and to a fixture apparatus for fixing a display section to the display apparatus.

2. Background Technology

In recent years, entertainment systems for providing music, video images, etc. to passengers are provided in the cabin of a vehicle, such as a passenger aircraft; for this purpose, a display apparatus for displaying video images are installed. In particular, a display apparatus for the entertainment system of an aircraft is herein taken as an example to describe.

FIGS. 14(a) and (b) are perspective views showing a display apparatus body 4 having a display section 6, such as an LCD display apparatus, installed in the ceiling portion and the lower portion of a baggage rack 5 in the cabin of a passenger aircraft. FIG. 14(a) shows the retracted state (the state of nonuse) of the display section 6 of the display apparatus body 4, and (b) of the same figure shows the state of use. In FIGS. 14(a) and (b), the display apparatus body 4 is arranged at the lower portion of the baggage rack 5 of the passenger aircraft, and comprises the display section 6 and an open/close operation portion 7. The display section 6 has a display member 8, such as an LCD flat panel. The display member 8 is held by the open/close operation portion 7 so as to keep the most suitable angle to a passenger. The opening in the display apparatus body 4 is covered with a cover 9 to prevent dirt and dust from entering during the use of the display section 6.

The display apparatus body 4 is fixed to the inside of a ceiling portion 3 at the lower portion of the baggage rack 5 by a fixture device that will be described below.

FIG. 15 is a sectional view showing the baggage rack 5 and the ceiling portion 3 below the lower portion thereof perpendicular to the direction from the rear to the nose of the aircraft (hereafter referred to as "nose direction"). In FIG. 15, the nose direction is a direction which is perpendicular to the face of the paper. Two rail installation stands 12 and 13 being parallel in the nose direction are fixed on the ceiling face 3A of the ceiling portion 3. A rail 14 is fixed to the lower face of the rail installation stand 12, and a rail 15 is fixed to the lower face of the rail installation stand 13. A left block 16 is attached to the rail 14, and a right block 17 is attached to the rail 15. As shown in FIG. 19, the left end portion 4A of the display apparatus body 4 is supported by the rail 14 (not shown) via the two left blocks 16 installed with a predetermined distance therebetween in the nose direction indicated by an arrow 68. In a similar way, the right end portion 4B of the display apparatus body 4 is supported by the rail 15 (not shown) via the two right blocks 17 installed with a predetermined distance therebetween in the nose direction. In other words, the display apparatus body 4 is installed on the ceiling face 3A via the two left blocks 16 and the two right blocks 17. The fixture device that will be described below comprises the left blocks 16, the right blocks 17 and a fixture block 25 that will be described later.

The display apparatus body 4 is required to be installable and removable on and from the rails 14 and 15 by simple operation so as to be replaced promptly at the time of a breakdown or the like. FIGS. 16(a), (b) and (c) are perspective views showing the conventional left block 16 configured so as to be installable and removable easily. FIGS. 16(a) to (c) show steps of installing the left block 16 on the rail 14 shown partially cut away. In FIG. 16(a), the left block 16 is inserted into the rail 14 from the opening 14A of the rail 4. Next, as shown in FIG. 16(b), a bar wrench 20 having a hexagonal cross-section is inserted into the hexagonal hole in a hexagonal socket head bolt 18 in the left block 16, and turned about 90° in a direction indicated by an arrow 29A as shown in (c) of the same figure. As a result, a nut plate 22 fixed to the tip of the hexagonal socket head bolt 18 is turned about 90°, whereby both the tip portions 22A thereof engage the bent portions 14B of the rail 14. One left block 16 has two hexagonal socket head bolts 18; hence, by turning four hexagonal socket head bolts 18 in total for the two left blocks 16 about 90°, the two left blocks 16 are installed on the rail 14. In this state, the left blocks 16 can be moved along the rail 14.

As shown in FIGS. 17(a) and (b), the fixture block 25 to be connected to the left block 16 is provided on the left end portion 4A of the display apparatus body 4. FIG. 17(a) is a perspective view showing a state before the fixture block 25 is connected to an attachment window 24 formed in the left block 16. The fixture block 25 has an arm 28 rotatably supported by a shaft 27 on a base plate 26. The arm 28 is thinned like the shape of a comb to reduce its weight. A projection plate 29 is provided at the end of the arm 28. The base plate 26 is fixed to the left end portion 4A of the display apparatus body 4 by three sets of bolts and nuts 30. The fixture blocks 25, two in number, as many as the left blocks 16, are fixed to the left end portion 4A. FIG. 17(b) shows a state wherein the projection plate 29 is inserted into the attachment window 24 of the left block 16 as will be described later in detail.

Next, description is made as to the right blocks 17 for supporting the right end portion 4B of the display apparatus body 4 shown in FIG. 15. As shown in FIG. 19, the two right blocks 17 are fixed in advance with the predetermined distance therebetween on the right end portion 4B of the display apparatus body 4.

FIGS. 18(a) to (c) show steps of attaching the right block 17 of the display apparatus body 4 to the right rail 15. Before these steps, at least two workers lift the display apparatus body 4, and insert the projection plate 29 of the arm 28 of the fixture block 25 into the installation window 24 as shown in FIG. 17(a). While one of the workers holds the display apparatus body 4 so that the projection plate 29 does not come out from the installation window 24, the other worker connects the connector (not shown) of a connection cable, which supplies electrical power and signals to the display apparatus body 4, to the display apparatus body 4 by using both hands. Subsequently, the right block 17 fixed to the right end portion 4B of the display apparatus body 4 is inserted into the inside of the rail 15 from the opening 15A of the rail 15 as shown in FIG. 18(a). At the time of the insertion, a triangular guide plate 33 of the right block 17 facilitates the insertion of the right block 17 into the opening 15A. The distance between the left and right rails 14 and 15 is not always constant but varies at various portions of the aircraft body. However, the projection plate 29 of the arm 28 shown in FIG. 18(a) moves in and out from the insertion window 24 depending on the variation, whereby the installation of the right block 17 is done without causing problems in spite of some variations.

Next, as shown in FIG. 18(b), a hexagonal socket head bolt 18 is turned by about 90° by using the wrench 20 in the direction indicated by an arrow 20A as shown in (c) of the same figure. As a result, a nut plate 22 fixed to the tip of the hexagonal socket head bolt 18 is turned about 90°, whereby both the tip portions 22A thereof engage the bent portions 15B of the rail 15. Two nut plates 22 are provided for one right block 17; hence, by turning four hexagonal socket head bolts 18 in total for the two right blocks 17 about 90°, the two right blocks 17 are attached to the rail 15. By turning the four bolts 18 further by a number of turns, the bent portions 15B are held between the tip portions 22A of the nut plates 22 and the right blocks 17, whereby the display apparatus body 4 is firmly fixed to the rail 15.

The right block 17 shown in FIG. 18 will be described further in detail. In the following explanations, the right block 17 is referred to as a fixture device 110.

FIG. 20 is an external view of a conventional fixture device 110. The fixture devices 110 are installed on the display apparatus body 4 as shown in FIG. 21. Next, as shown in FIG. 22, the display apparatus body 4 is fixed to the rails 111 on the body side in the ceiling portion of a vehicle by turning hexagonal socket head bolts 116 by using a bar wrench 112 having a hexagonal cross-section as shown in FIGS. 25(a) to (d). FIG. 23, an exploded view, shows the configurations of the components of the conventional fixture device 110. FIGS. 24(a), (b), (c) and (d), elevation views, and FIGS. 25(a), (b), (c) and (d), perspective view, show the sequence of the installation work.

A nut plate 114 shown in FIG. 23 has an internal thread at its center, and installed between the rib 113x of a height X and the rib 113y of a height Y of a block 125, by using bolts 116 each passing through a washer 117 and a highly flexible coil spring 120. The following relationships are selected among the height X of the rib 113x, the height Y of the rib 113y and the thickness (hereafter simply referred to as the thickness of the rail 111) of the rack portions 111m and 111n of the rail 111 shown in FIG. 24. Namely, the relationships are as follows: the height X ≦ the thickness of the rail 111 and the height X< the height Y.

A nut 121 is engaged with the tip of the bolt 116 and fixed to the bolt 116 with an adhesive. At this time, as shown in FIG. 24(b) and FIG. 25(b), the nut 121 is turned when the bar wrench 112, having a hexagonal cross-section, for example, is inserted into the hexagonal hole in the bolt 116 and raised and turned clockwise. As a result, the nut plate 114 passes the rib 113x (FIG. 23) having the height X of the block 113 and is turned clockwise. It is fixed to the bolt 116 so as to have a height making contact with the rib 113y having the height Y of the block 113, and thereby not turning, if the wrench is turned counterclockwise. The block 113 is connected to the base 115 via a through shaft 123, and the through shaft 123 is fixed by a split pin 124 inserted into the rear (right) end thereof.

In this configuration, the wrench 112 is inserted into the hexagonal hole of the bolt 116 and raised and turned clockwise. At this time, the nut plate 114 passes over the rib having the height X of the block 113, turns clockwise and makes contact with the inner walls 111w (FIG. 24 and FIG. 25) of the rail 111 having a frame shape in cross-section, and then stops. The display apparatus 4 has nut plates at eight positions in total, and all of them are set in this state. However, when the bolts 116 are loosened slightly from its completely tight position, the display apparatus 4 can be moved slightly along the rail 111, whereby positional adjustment is made possible.

By tightening the bolts 116 further as shown in FIG. 24(c) and FIG. 25(c), the conventional fixture device 110 is fixed to the rail 111. By completely fastening the nut plates at all the eight positions in a similar way, the display apparatus 4 can be fixed completely to the rails 111 on the aircraft body in the ceiling portion. When removing the display apparatus 4, the nut plate 114 is released by turning the bolt 116 counterclockwise, thereby releasing the friction force with the rack-shaped portions 111m and 111n of the rail 111. The nut plate 114 is turned counterclockwise depending on the turning of the bolt 116 and makes contact with the higher rib on the upper face of the block 113, that is, the rib 113y having the height Y. In this state, when the bolt 116 is turned counterclockwise further until the nut plate 114 is raised by the bolt 116 to a position making contact with the nut 121, the nut plate 114 is moved beyond the rib 113y and becomes parallel with the opening groove 111g (FIG. 25) of the rail 111. In a similar way, all the nut plates 114 at all the eight positions are turned counterclockwise so that the nut plates 114 become parallel with the opening grooves 111g, whereby the display apparatus 4 can be removed from the rails 111 of the aircraft body in the ceiling portion.

Next, a latch device for fixing the display section 6 having the display member 8 to the display apparatus body 4 in a retracted state will be described. The display section 6 is retracted into the display apparatus body 4 during takeoff and landing. The display apparatus body 4 is provided with the latch devices to prevent the display section 6 from jumping out because of shocks and the like during takeoff and landing.

A conventional latch device will be described referring to FIGS. 14(a) and (b) and FIGS. 26(a) and (b). FIGS. 26(a) and (b) show the latch operation of the conventional latch device. A conventional latch device 230 shown in FIG. 26(a) is disposed on the display apparatus body 4 and engages the display section 6 retracted into the display apparatus body 4, thereby preventing unnecessary opening of the display section 6. FIGS. 26(a) shows the state of the engagement, and (b) thereof shows an intermediate state in an opening operation. Furthermore, FIGS. 26(c) and (d) show intermediate states in the retraction.

The operation of the conventional latch device will be described below in accordance with an operation sequence shown in FIGS. 26(a) to (d). FIG. 26(a) shows a state wherein the display section 6 is retracted into the display apparatus body 4, and the engagement protrusion 236 of the rotary shaft 234 of the latch device 230 engages the recessed section 260 formed at the bottom face of the display section 6. The rotary shaft 234 is combined with a rotary plate 232 so as to be rotatable about a shaft 235. The rotary shaft 234 is held by an elastic plate spring 237 that is bent slightly with respect to the rotary plate 232. When the engagement protrusion 236 of the rotary shaft 234 engages the recessed section 260 of the display section 6, a slide shaft 233 is inserted into a hole formed on the side face of the rotary plate. As a result, the rotary plate 232 is prevented from rotating, and the engagement state of the engagement protrusion 236 and the recessed section 260 is maintained. As a result, the display section 6 is prevented from jumping out from the display apparatus body 4 because of shocks and the like.

FIG. 26(b) shows a state wherein the opening operation is performed, that is, the display section 6 is rotated with respect to the display apparatus body 4 and opened. The open/close operation portion 7 (FIG. 14) controls a direct current applied to a plunger 238 by an opening command from a microcomputer provided outside the apparatus so that the opening operation is performed, that is, the display section 6 is rotated and opened. When the direct current flows through the plunger 238, the slide shaft 233 disengages the hole in the rotary plate 232. As a result, the rotary shaft 234 and the rotary plate 232 become integrally rotatable about the shaft 235. Hence, the rotary shaft 234 is rotated by the opening operation of the display section 6, and the engagement projection 236 disengages the recessed section 260.

When the display section 6 no longer contacts the engagement protrusion 236, the rotary shaft 234 and the rotary plate 232 are pressed by a spring 231 and return to a position shown in FIG. 26(a). At this time, no direct current flows through the plunger 238, and the slide shaft 233 is moved to its original position by a spring that is not shown. Therefore, the slide shaft 233 is inserted into the hole formed on the side face of the returned rotary plate 232 to obtain engagement of the display section 6 with the engagement protrusion 236 again. When the slide shaft 233 is inserted into the hole of the rotary plate 232 as described above, the engagement protrusion 236 of the rotary shaft 234 is held by the plate spring 237 so as to be rotatable about 40 degrees counterclockwise.

As described above, in the retraction state of the display section 6, the slide shaft 233 is inserted into the hole in the rotary plate 232. For this reason, the engagement protrusion 236 of the rotary shaft 234 does not rotate clockwise in FIG. 26(a). Incidentally, in this retraction state, the engagement protrusion 236 is rotatable counterclockwise in FIG. 26(a), but does not rotate further since the display apparatus body 4 is disposed above the display section 6.

FIGS. 26(c) and (d) show the state of retracting the display section 6. At this time, the engagement protrusion 236 of the rotary shaft 234 makes contact with the display section 6 and rotates counterclockwise. Then, when the engagement protrusion 236 engages the recessed section 260 of the display section 6, the engagement protrusion 236 is returned to its original position by the plate spring 237, and the display position 6 is securely retracted and held in the display apparatus body 4.

The conventional fixture device has the following problems. When installing the display apparatus body 4 on the left and right rails 14 and 15, at least two workers are required. Hence, one problem of the conventional fixture device is that the labor cost for the installation is high.

The present invention is intended to provide a fixture device for a display apparatus body, capable of being installed by one worker.

Furthermore, when an attempt is made to place the nut plate 114 on the rack-shaped portions 111m and 111n by inserting the wrench 112 into the hole in the bolt 116 and by raising and turning the wrench clockwise in this kind of conventional fixture device, if the nut plate 114 is not sufficiently raised, the nut plate 114 will not clear the rib 113x, having the height X, of the block 113. When the bolts are tightened in this state wherein the nut plate is present between the rib 113x and the rib 113y of the block 113, having the height X and the height Y, respectively, as shown in FIG. 24(d) (when the bolts are tightened at improper positions), both ends of the nut plate 114 are not placed properly on the rack-shaped portions 111m and 111n of the rail 111. Hence, even when tightened, the nut plate 114 is only engaged with the upper face of the block 113 as shown at the upper right in FIG. 25(d) and FIG. 24(d). If both the nut plates 114 are in this state, the fixture device 110 disengages from the rail 111. However, at this time, the bolts 116 are completely tightened and secured, just as in the case shown in FIG. 24(c) wherein the bolts are tightened at proper positions.

Although one fixture device has two nut plates 114, even if both of the bolts 116 are tightened firmly, this state is not reliable. This is because it is impossible to determine whether both of the nut plates 114 are installed at their proper positions because the state of the installation is unable to be seen from the outside. If all of the nut plates 114 are not placed on the rack-shaped positions 111m and 111n at the proper positions, proper strength cannot be obtained. Hence, if vibrations are encountered for an extended time, an improperly installed apparatus, such as a display apparatus, could potentially fall from the fixture device and land on a passenger seat below, presenting a very dangerous situation.

The present invention intends to solve the above-mentioned problem by detecting a wrong installation in the case that the nut plates are tightened at the improper positions.

Furthermore, in the conventional latch device, the rotary shaft 234 is rotated so that the engagement protrusion 236 engages the recessed section 260 in the display section 6. Therefore, it is required that the size of the recessed section 260 in the display section 6 is made larger than the shape of the engagement protrusion 236 so as to give a clearance therebetween. As a result, a problem of the conventional latch device is that the retracted display section 6 rattles depending on the clearance when it receives shocks and the like. Furthermore, another problem of the apparatus is that, since the drive shaft of the plunger 238 is linearly connected to the slide shaft 233 in the drive direction thereof, the apparatus is relatively large. Still further, the conventional latch device comprises many components having complicated shapes, which increase the cost of production and cause the problem of raising the cost of the apparatus.

The present invention is intended to provide a latch device comprising a reduced number of components having simple shapes, wherein the latch devices provided for a display section and a display apparatus body are fitted securely without wobble in the retracted state, and the display apparatus provided with the latch devices can be made compact.

BRIEF SUMMARY OF THE INVENTION

A fixture device in accordance with the present invention comprises a block to be fixed to a rail provided in the ceiling portion of a vehicle for installing a display apparatus, wherein an installation window is formed in the side portion thereof and a latch hole is formed in the installation window, and a fixture block installed on the display apparatus body, including a projection section to be inserted into the above mentioned installation window, and a release lever having a cut-and-raised portion serving as a latch that enters the latch hole in the installation window and prevents the projection section from separating from the installation window when the projection section is inserted into the installation window.

When the projection section is inserted into the installation window, the cut-and-raised portion enters in the latch hole, preventing the projection section from separating from the block. Hence, even if a worker who installs the display apparatus releases his hands from the display apparatus, the display apparatus is supported by the block and does not drop, whereby the worker can carry out cable connection work with both hands.

A fixture device of an apparatus in accordance with another aspect of the present invention for fixing an apparatus, such as a display apparatus to an external face of the ceiling portion or the like of a vehicle, comprises:

at least one pair of rails, installed near an opening for installing an apparatus in a space of the above-mentioned ceiling portion, for carrying a load applied when an apparatus is installed, each rail provided with a frame-shaped cross-sectional structure having an internal space therein, and also having a narrow opening groove being open outward, i.e., downward, from the internal space and a pair of narrow rack-shaped portions formed on both sides of the opening groove, a block of the fixture device, having loose-fitting holes in a vertical direction and having an upper width suited so that the upper portion thereof is inserted into the opening groove, bolts loosely fitted into the loose-fitting holes of the block of the fixture device, a loose-fitting cylinder body having a predetermined length, loosely fitted between the external circumference of the bolt and the loose-fitting hole, nut plates of narrow shape each having a nut hole screwed with the bolt and having a length larger than the width of the opening groove and having a width smaller than the width thereof, wherein when the bolt is turned substantially 90° around the axis thereof while the bolt is pushed upward after the nut plate is pushed upward and inserted into the space in the rail through the opening groove, both end portions thereof extend across the opening groove, are placed on the pair of rack-shaped portions and pulled downward by a tightening action owing to the rotation of the bolt screwed into the nut hole, thereby firmly making contact with the rack-shaped portions of the rail and fixed thereto, and a fixing member for engaging the apparatus with the block of the fixture device.

An apparatus installation method in accordance with the present invention comprises:

a step of loosely fitting a bolt, over which a cylinder having a predetermined length is loosely fitted, into a hole in a block of a fixture device, a step of inserting a narrow nut plate having a nut hole screwed to the upper portion of the bolt, having a width smaller than the width of an opening groove in the lower face of a rail disposed in the space of the ceiling and having a length larger than the width into a space in the rail from the opening groove in the lower face of the rail while the narrow direction thereof is aligned with the narrow direction of the opening groove, a step of engaging both end portions of the nut plate inserted into the space in the rail with the rail by pushing and turning the bolt so that the nut plate is turned substantially 90° around the axis of the nut hole and the end portions are placed on the rack-shaped portions on both sides of the opening groove of the rail, a step of pressing and fixing the nut plate to the rack-shaped portions of the rail by tightening the bolt while maintaining the engagement so that the nut bolt is pulled by the bolt in a state wherein a clearance as large as the thickness of the rack-shaped portions is maintained between the nut plate and the upper face of the block, and a step of fixing the apparatus to the fixture device.

A latch device in accordance with the present invention comprises:

a display apparatus having a display apparatus body installed in the ceiling portion or the like of a vehicle and a display section retracted so that it can be extended from the display apparatus body, a plunger section, fixed to the display apparatus body, for driving an actuator section on the basis of input signals, pressing means that is bent by the driving of the actuator section, sliding means, the movement of which is restricted by the bending of the pressing means, and a latch section that projects toward the display section retracted in the display apparatus body in accordance with the movement of the sliding means.

The latch device configured as described above comprises fewer number of components having simple shapes, and the display section can be securely fitted into the display apparatus body in its retraction state, whereby the display apparatus provided with the latch device can be made compact.

A latch device in accordance with another aspect of the present invention is configured so that the latch section has an upper latch and a lower latch, so that the upper latch and the lower latch are engaged with each other via balls so as to interlock with each other, and so that projection section fitted into the recessed section in the display section and inclined section making contact with the end portion of the sliding means are formed on the upper latch and the lower latch, and the upper latch and the lower latch of the latch section move in response to the movement of the sliding means. With this configuration, when the display section is retracted in the display apparatus body, the tip of the latch section of the latch device in accordance with the present invention is fitted in the recessed section in the display section, whereby the display section is prevented from jumping out from the ceiling portion or the like in which the display apparatus body is provided, owing to vibration, shocks and the like; when the display section is opened to a given angle by drive means, such as an electric motor or when the display section is retracted from its open state by elastic means, such as a spring, the latch section is pushed back, thereby not preventing the operation of the display section.

A latch device in accordance with another aspect of the present invention is configured such that holes engaging the balls in the upper latch are slots extending in the projection direction of the latch section, and holes engaging the balls in the lower latch are round holes preventing the rolling of the balls, when the upper latch moves in a direction opposite to its projection direction, the lower latch also moves horizontally, and when the lower latch moves in a direction opposite to its projection direction, the upper latch starts moving after the lower latch has moved by a predetermined distance. With this configuration, the latch device in accordance with the present invention does not prevent the operation of the display section when the display section is opened to a given angle by drive means, such as an electric motor, by components having simple shapes, and the latch device does not prevent the operation of the display section either when the display section is retracted from the open state into the ceiling portion having the display apparatus body by elastic means, such as a spring.

A latch device in accordance with another aspect of the present invention is configured such that when the display section is retracted in the display apparatus body, the projection sections of the upper latch and the lower latch are fitted into the recessed section in the display section, the upper latch is prevented from moving by the sliding means, and the inclined section of the lower latch makes contact with the end portion of the sliding means. With this configuration, the latch device in accordance with the present invention can reduce a clearance (a rattle) when the projection sections of the latch section are fitted into the recessed section in the display section.

A latch device in accordance with another aspect of the present invention is configured such that when the display section is developed from the display apparatus body, the actuator section is driven by the plunger section, the fixed state of the sliding means by the pressing means formed of a plate spring is released, and the sliding means is made movable so that the upper latch can move in the direction opposite to its projection direction. With this configuration, the latch device in accordance with the present invention does not prevent the extending operation of the display section when the display section is opened to a given angle by drive means, such as an electric motor, by components having simple shapes.

A latch device in accordance with another aspect of the present invention is configured such that when the display section is retracted into the display apparatus body, the display section makes contact with the lower latch, the lower latch is pushed back, the sliding means is driven by the movement of the lower latch, and the end portion of the sliding means makes contact with the inclined section of the upper latch so that the upper latch can move in the direction opposite to its projection direction. With this configuration, the latch device in accordance with the present invention does not prevent the operation of the display section when the display section is retracted into the display apparatus body, whereby the display section is retractable securely.

A latch device in accordance with another aspect of the present invention is characterized in that the plunger section and the sliding means are disposed so that the movement direction of the actuator is substantially perpendicular to the movement direction of the sliding means. With this configuration, the depth of the display apparatus body provided with the latch device in accordance with the present invention can be reduced.

BRIEF DESCRIPTION OF THE SEVERAL VIEWS OF THE DRAWINGS

FIG. 1 (a) is a perspective view showing a state before the connection of a left block 36 and a fixture block 45 in accordance with a first embodiment of the present invention;

FIG. 1(b) is a perspective view showing a state after the connection of the left block 36 and the fixture block 45;

FIG. 3(a) is a sectional view taken on line III—III of FIG. 1, showing the connection state of the left block 36 and the fixture block 45 in accordance with the first embodiment of the present invention and also showing a state wherein the cut-and-raised portion 52A of a release lever 52 falls in a latch hole 44A;

FIG. 3(b) is a view showing a state wherein the cut-and-raised portion 52A comes out from the latch hole 44A;

FIGS. 7(a), (b), (c) and (d) are sectional views showing a state wherein a display apparatus is fixed to a rail by the fixture device in accordance with the above-mentioned second embodiment;

FIG. 11(a) is a sectional view showing the latch device in accordance with the third embodiment, showing the retracted state of the display section; and FIG. 11(b) shows the extended state of the display section;

FIG. 14(a) is a perspective view showing a state wherein the display section 6 of the display apparatus body 4 in accordance with the conventional example and the present invention in the ceiling portion of the cabin of a passenger aircraft is not used; and FIG. 14(b) is a perspective view showing a state wherein the display section 6 is used;

FIG. 17(a) is a perspective view showing a state before the conventional left block 16 is connected to the fixture block 25; and FIG. 17(b) is a perspective view showing a state after the connection;

FIGS. 25(a), (b), (c) and (d) are perspective views showing the operation sequence at the time when the conventional fixture device is installed.

DETAILED DESCRIPTION OF THE INVENTION

Figure 2:
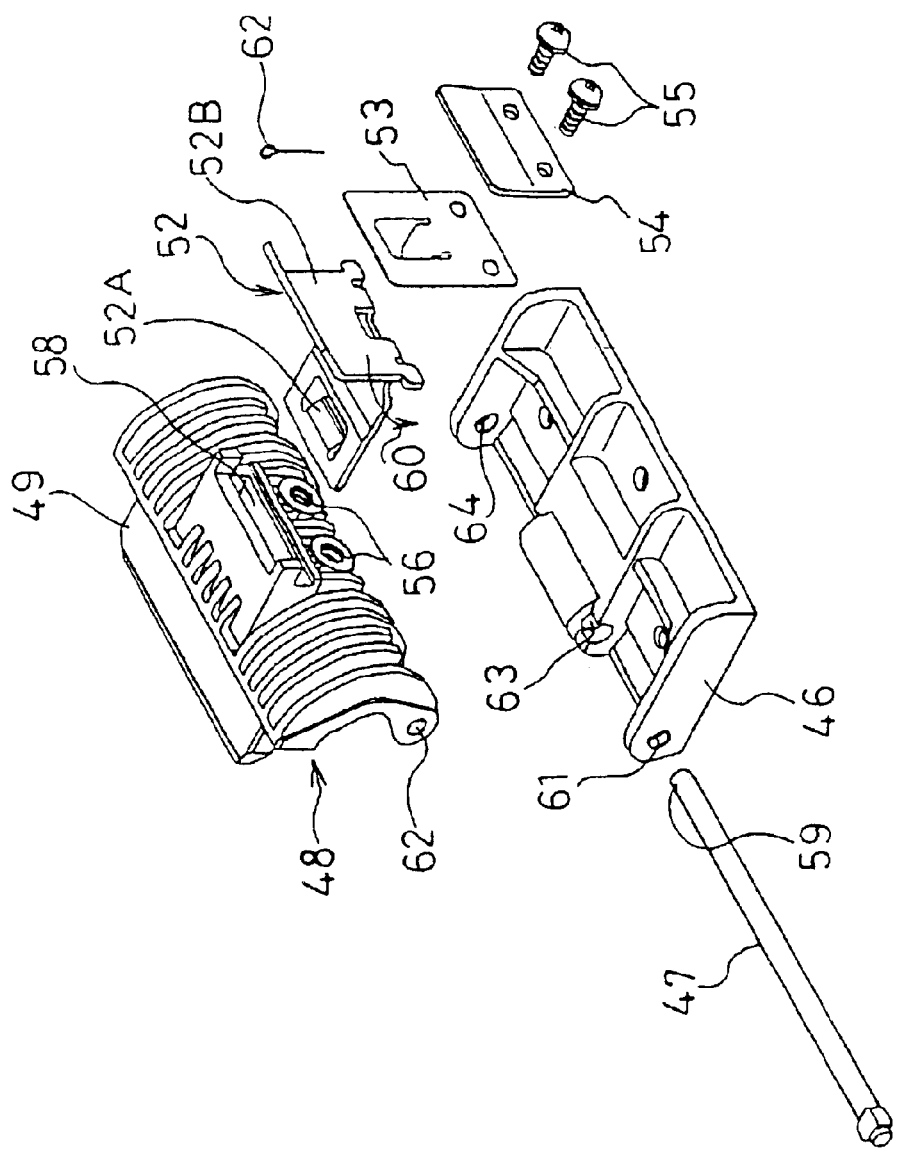
FIG. 2 is an exploded perspective view showing the fixture block in accordance with the first embodiment of the present invention.

Preferred embodiments of the present invention will be described referring to FIG. 1 to FIG. 13.

<<First Embodiment>>

A fixture device in accordance with a first embodiment of the present invention will be described referring to FIG. 1 to FIG. 4. The fixture device of the present invention is an improvement of the conventional fixture device comprising the left block 16 and the fixture block 25 for supporting the left end portion 4A of the display apparatus body 4 in FIG. 17 of the conventional technology. Since the configurations other than the left block and the fixture block are the same as those in the description of the above-mentioned conventional technology, the components are designated by the same reference numerals and described simply.

Figure 16:
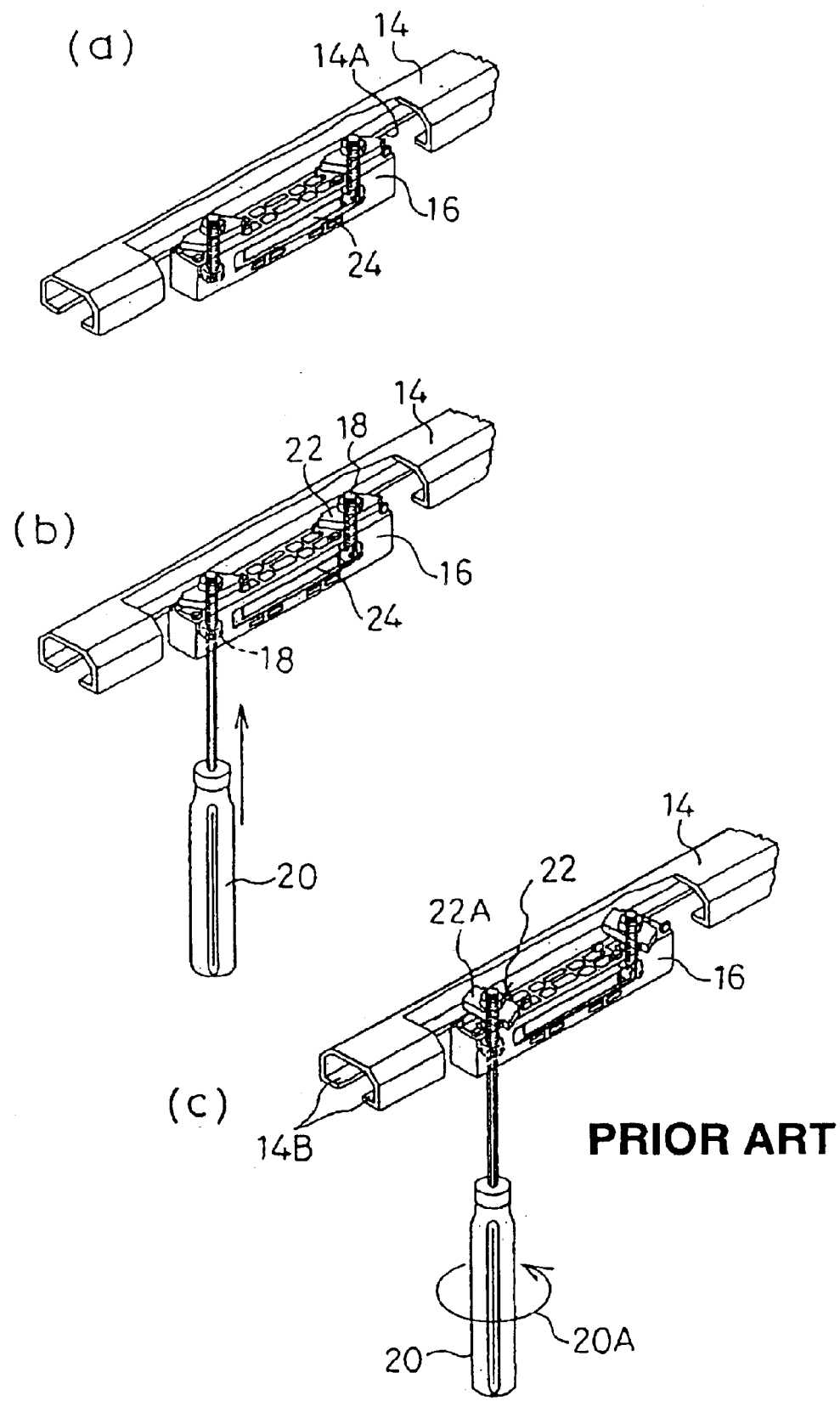
FIGS. 16(a), (b) and (c) are perspective views showing steps of installing the conventional left block 16 on the left rail 14.

FIG. 1(a) is a perspective view showing the fixture device in accordance with the present invention, and shows a state before the projection plate 49 of a fixture block 45 is inserted into the installation window 44 of a left block 36 so as to couple both. FIG. 1(b) shows a state after both have been coupled by the insertion. The left block 36 is attached to a rail 14 that is not shown, in accordance with steps similar to those for the conventional technology shown in FIG. 16. The base plate 46 of the fixture block 45 is fixed to the display apparatus body 4 with three sets of the bolts and nuts 30.

FIG. 2 is an exploded perspective view of the fixture block 45. In this figure, an arm 48 thinned like the shape of a comb has the projection plate 49 to be inserted into the installation window 44 of the left block 36. As shown in the sectional view of FIG. 3 (the cross-section III—III of FIG. 1), the projection plate 49 has a hollow portion 57 having an opening in its lower face. A guide hole 58 communicating with the above-mentioned hollow portion 57 of the projection plate 49 is provided at the center portion of the arm 48 shown in FIG. 2. An L-shaped release lever 52 is inserted into the guide hole 58. A plate spring 53 for applying a rotation force to the release lever 52 in a direction indicated by an arrow 60 and a holder 54 are placed upon the lever section 52B of the release lever 52, and fixed with two male screws 55 to the female threads 56 in the arm 48. Hence, the release lever 52 is biased in the direction indicated by the arrow 60 in FIG. 3(a). A cut-and-raised portion 52A is provided at the tip of the release lever 52. The cut-and-raised portion 52A is a tongue-shaped section projecting downward from the lower face of the release lever 52 as shown in FIG. 3(a). When the projection plate 49 is inserted into the installation window 44 of the left block 36 shown in FIG. 1(a), the cut-and-raised portion 52A falls into a latch hole 44A in the installation window 44 as shown in FIG. 3(a), thereby preventing the projection plate 49 from escaping from the installation window 44.

When removing the projection plate 49 from the installation window 44, the bent portion 52B of the release lever 52 is pressed in a direction indicated by an arrow 66 as shown in FIG. 3(b). As a result, the release lever 52 rotates in a direction opposite to the direction of the arrow 60 shown in FIG. 3, whereby the cut-and-raised portion 52A is removed from the latch hole 44A. When the arm 48 is pulled to the right in the figure in this state, the projection plate 49 comes out from the installation window 44. Since the width of the latch hole 44A is larger than the width of the cut-and-raised portion 52A, the projection plate 49 can move slightly side-to-side with respect to the left block 36 in the state shown in FIG. 3(a).

In FIG. 2, by passing a shaft 47 through holes 61, 63 and 64 in the base plate 46 and a hole 62 in the arm 48, the arm 48 can be rotatably mounted on the base plate 46. A split pin 62 is inserted into a fastening hole 59 formed at the right end of the shaft 47, thereby preventing the shaft 47 from escaping.

Figure 4:
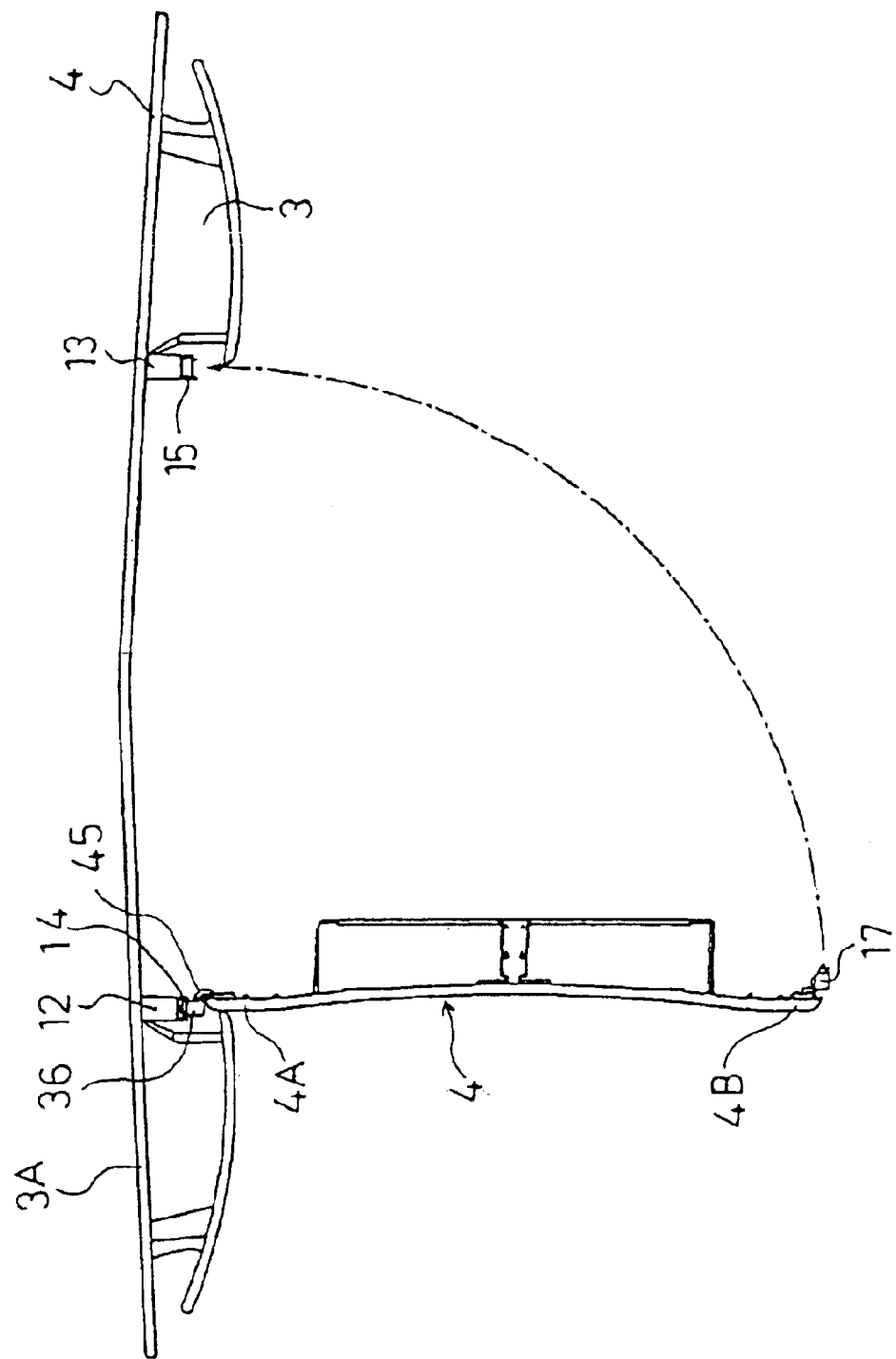
FIG. 4 is a side sectional view showing a state wherein a display apparatus body hangs down from the left blocks.
Figure 15:
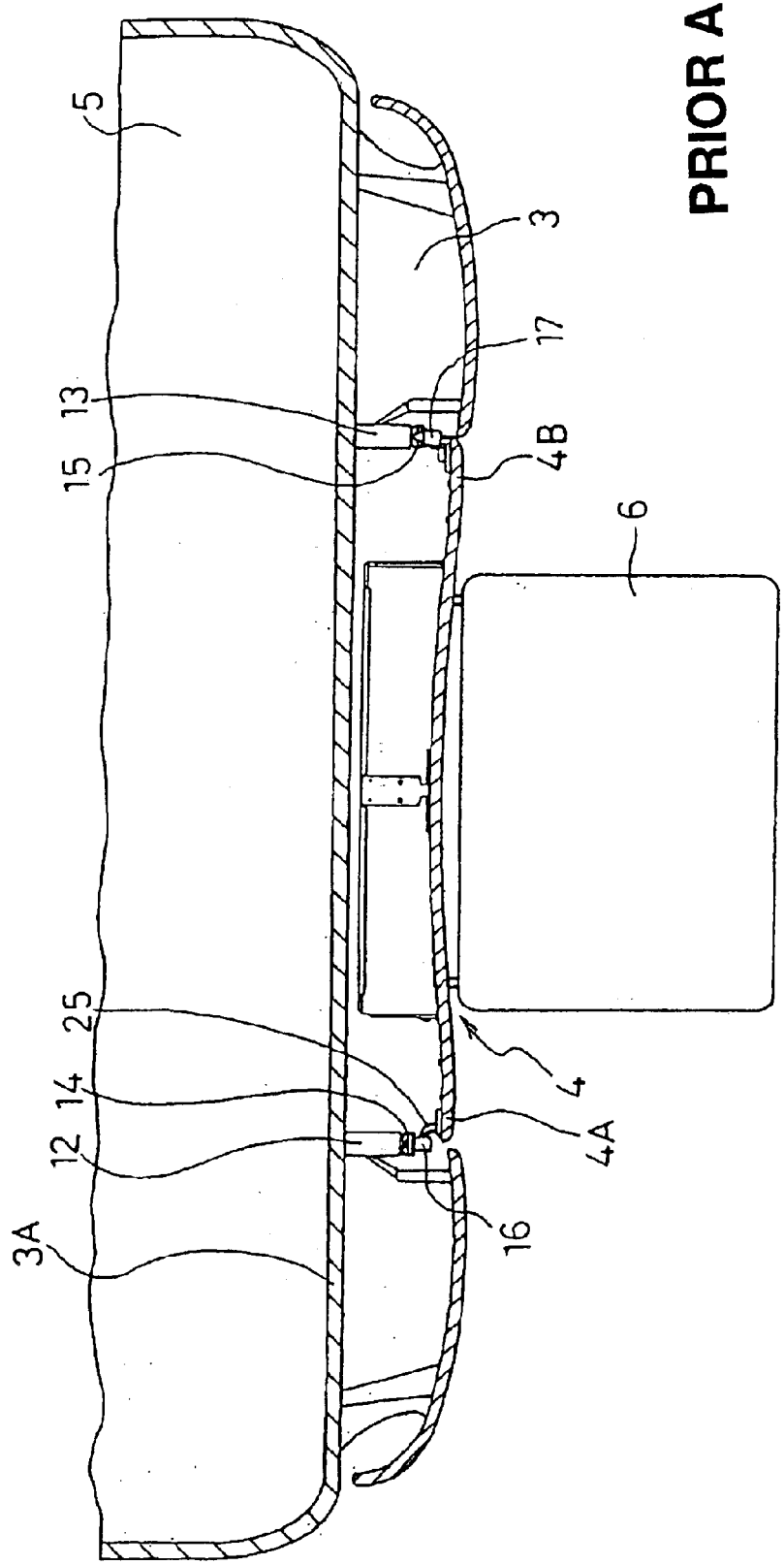
FIG. 15 is a cross sectional view showing the ceiling portion of the cabin of the passenger aircraft provided with the display apparatus body in accordance with the conventional example and the present invention, viewed from the rear to the nose of the aircraft.
Figure 18:
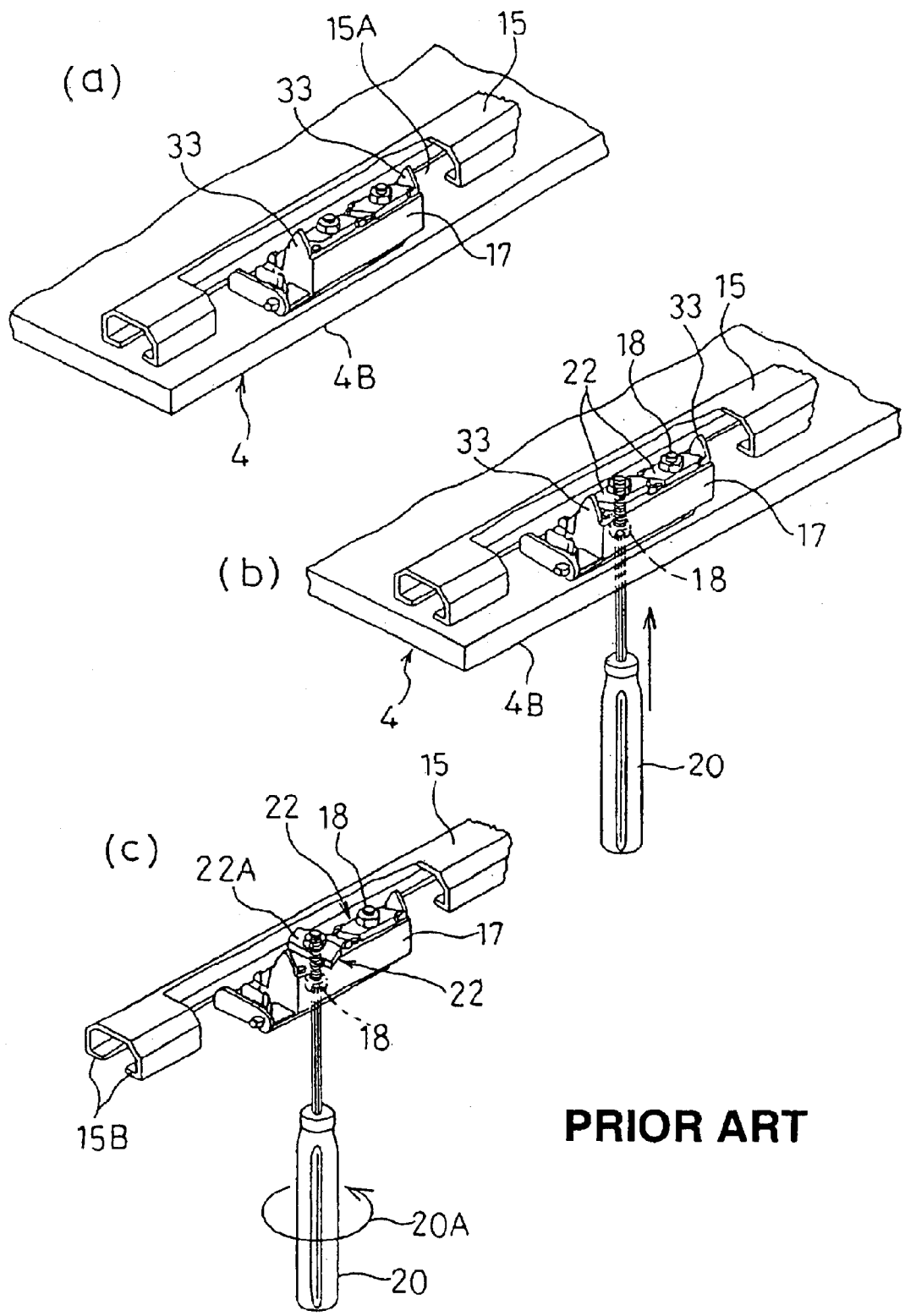
FIGS. 18(a), (b), and (c) are perspective views showing steps of installing the conventional right block 17 on the right rail 15.
Figure 19:
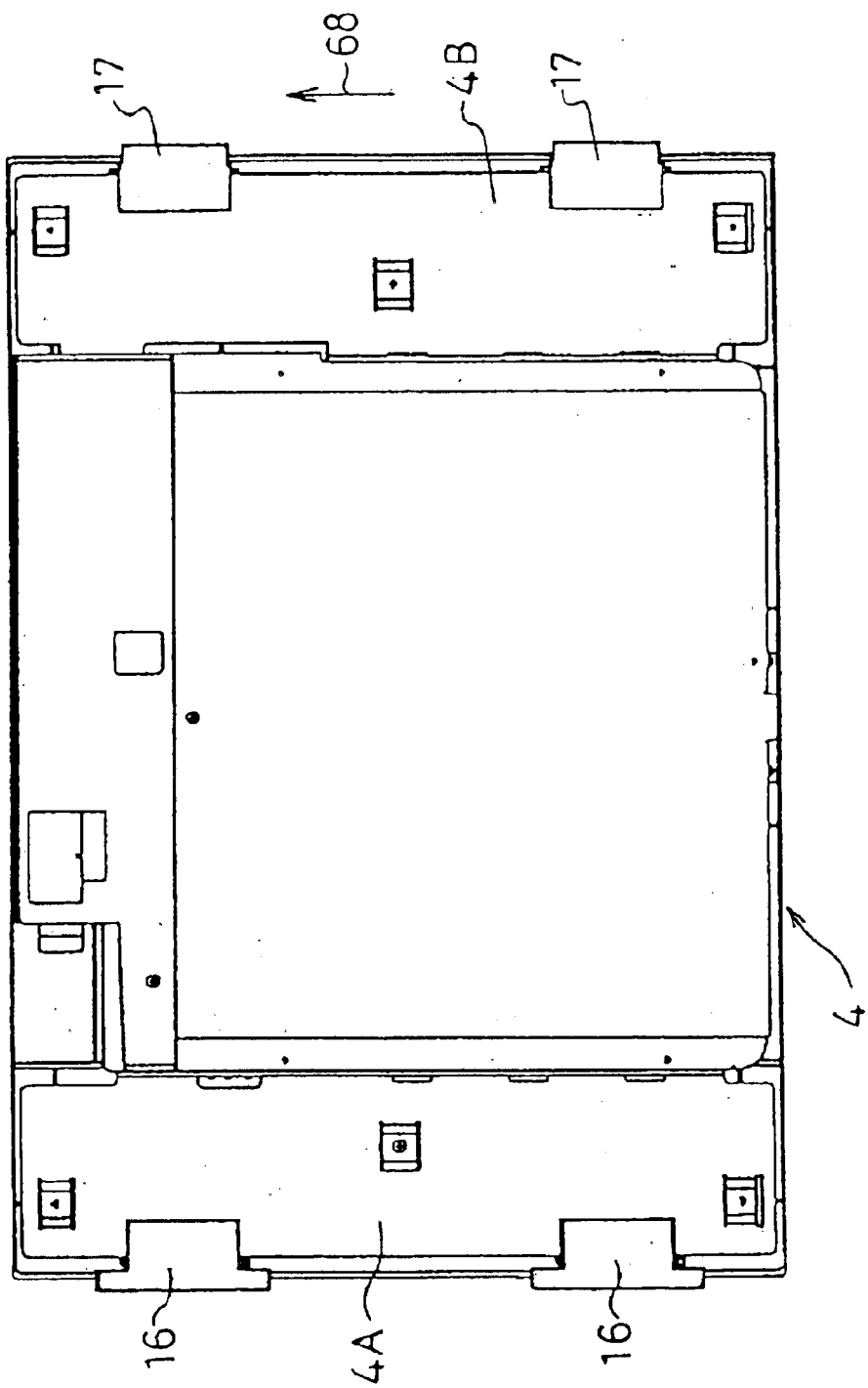
FIG. 19 is a bottom view showing the display apparatus body 4 in the ceiling portion of the cabin of the passenger aircraft, viewed from below.
Figure 20:
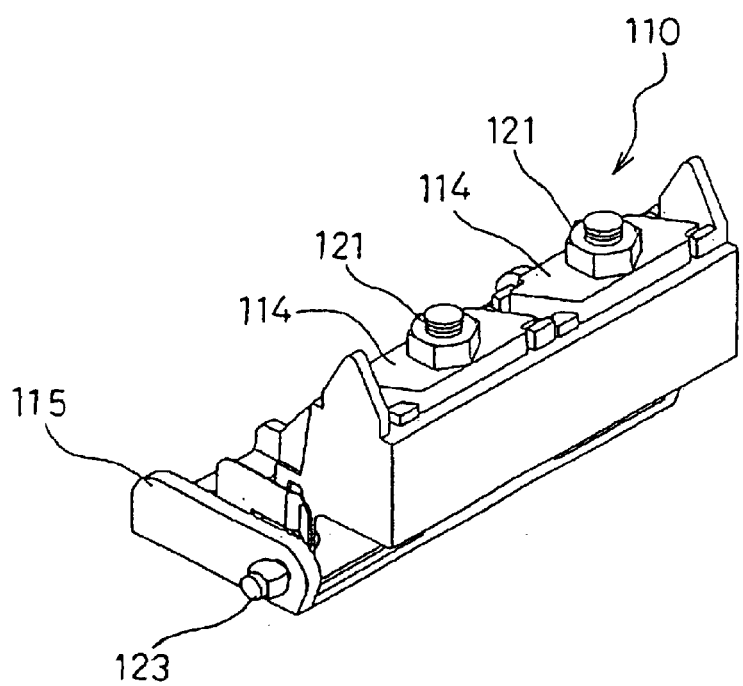
FIG. 20 is a perspective view showing the conventional fixture device.

Description is made as to steps of installing the display apparatus body 4 provided with the fixture devices in accordance with this embodiment on the left and right rails 14 and 15 shown in FIG. 15 by one worker referring to FIG. 1, FIG. 3, FIG. 4, FIG. 16 and FIG. 18. The worker attaches the left blocks 36 to the rail 14 in accordance with steps similar to those for the conventional left blocks 16 shown in FIG. 16. The fixture blocks 45 in accordance with this embodiment are attached beforehand to the left end portion 4A of the display apparatus body 4 by using the bolts and nuts 30. Blocks similar to the conventional right blocks 17 shown in FIG. 18 are attached beforehand to the right end portion 4B of the display apparatus body 4. The worker lifts the display apparatus body 4 configured as described above and inserts the projection plates 49 of the fixture blocks 45 into the installation windows 44 of the left blocks 36. As shown in FIG. 3(a), the cut-and-raised portion 52A of the release lever 52 falls into the latch hole 44A of the installation window 44 as shown in FIG. 3(a), thereby preventing the projection plate 49 from being removed from the installation window 44. When the worker releases his hands from the display apparatus body 4 in this state, the display apparatus body 4 hangs from the left blocks 36, as shown in FIG. 4. The worker can connect connectors of connection cables, which supply electrical power and signals to the display apparatus body 4, with both of his free hands.

After completion of connection of the connectors, the worker lifts the right end portion 4B of the display apparatus body 4, inserts the right blocks 17 into the openings 15A of the rail 15 as shown in FIG. 18, and mounts the right blocks 17 on the rail 15 by using the wrench 20 in a method similar to the conventional method. Since the hole 44A is made wider than the cut-and-raised portion 52A, the projection plate 49 can move slightly with respect to the left block 36, whereby the right block 17 can be inserted easily into the opening 15A of the rail 15 even when a slight positional deviation is present between the rail 15 and the right block 17. By turning the hexagonal socket head bolts 18 about 90° by using the wrench 20, the right block 17 can be mounted on the rail 15.

In this state, the left blocks 16 and the right blocks 17 are supported by the rails 14 and 15 via only the tip portions 22A of the nut plates 22. Hence, the display apparatus body 4 can be moved and positioned at a desired position by sliding the left blocks 36 and the right blocks 17 inside the rails 14 and 15. After completion of the positioning of the display apparatus body 4, the four hexagonal socket head bolts 18 for the two left blocks 36 and the four hexagonal socket head bolts 18 for the two right blocks 17 are turned by a number of turns in the direction indicated by the arrow 20A shown in FIG. 16 and FIG. 18. As a result, the bent portions 14B of the rail 14 are held between the tip portions 22A of the nut plates 22 and the upper face of the left block 36, thereby fixing the left block 36 to the rail 14. In a similar way, the bent portions 15B of the rail 15 are held between the tip portions 22A of the nut plates 22 and the upper face of the right block 17, thereby fixing the right block 17 to the rail 15.

<<Second Embodiment>>

A second embodiment of the present invention will be described referring to FIG. 5 to FIG. 8, FIG. 14, FIG. 20 and FIG. 22. The present embodiment relates to an improvement in a fixture device for fixing a display apparatus to a ceiling portion.

In the fixture device of the present embodiment, the nut plates of the fixture device are pushed upward, rotated into contact with the rail of the ceiling portion of a vehicle, and then tightened using bolts. Hence, the nut plates are fixed to the rail, thereby fixing the display apparatus to the ceiling portion. In a state before the bolts are tightened completely, the display apparatus can be moved to a desired position along the rail.

In the device of the present embodiment, when the bolt is tightened at an improper position such that the nut plate of the above-mentioned fixture device is not placed properly on the rack-shaped section of the rail at the ceiling portion of the vehicle, a wobble (play) occurs in the axial direction of the bolt. The fact that the device is improperly installed is identifiable by this wobble. Hence, the heavy display apparatus can be fixed securely on the ceiling portion of the vehicle, thereby enhancing safety and reliability.

Figure 5:
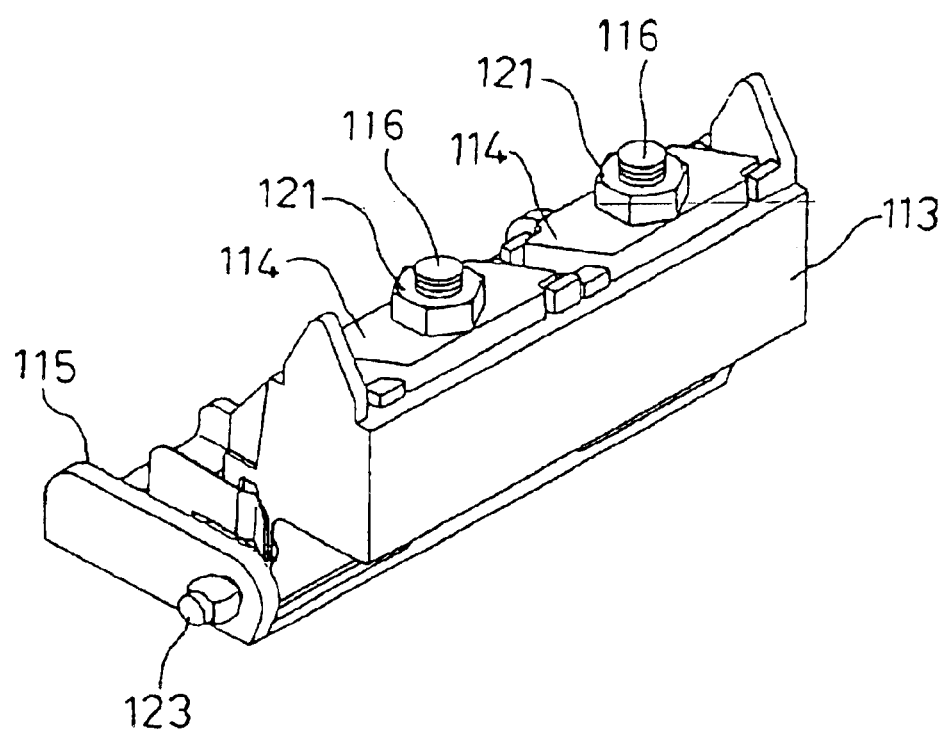
FIG. 5 is a perspective view showing a fixture device in accordance with a second embodiment of the present invention.
Figure 6:
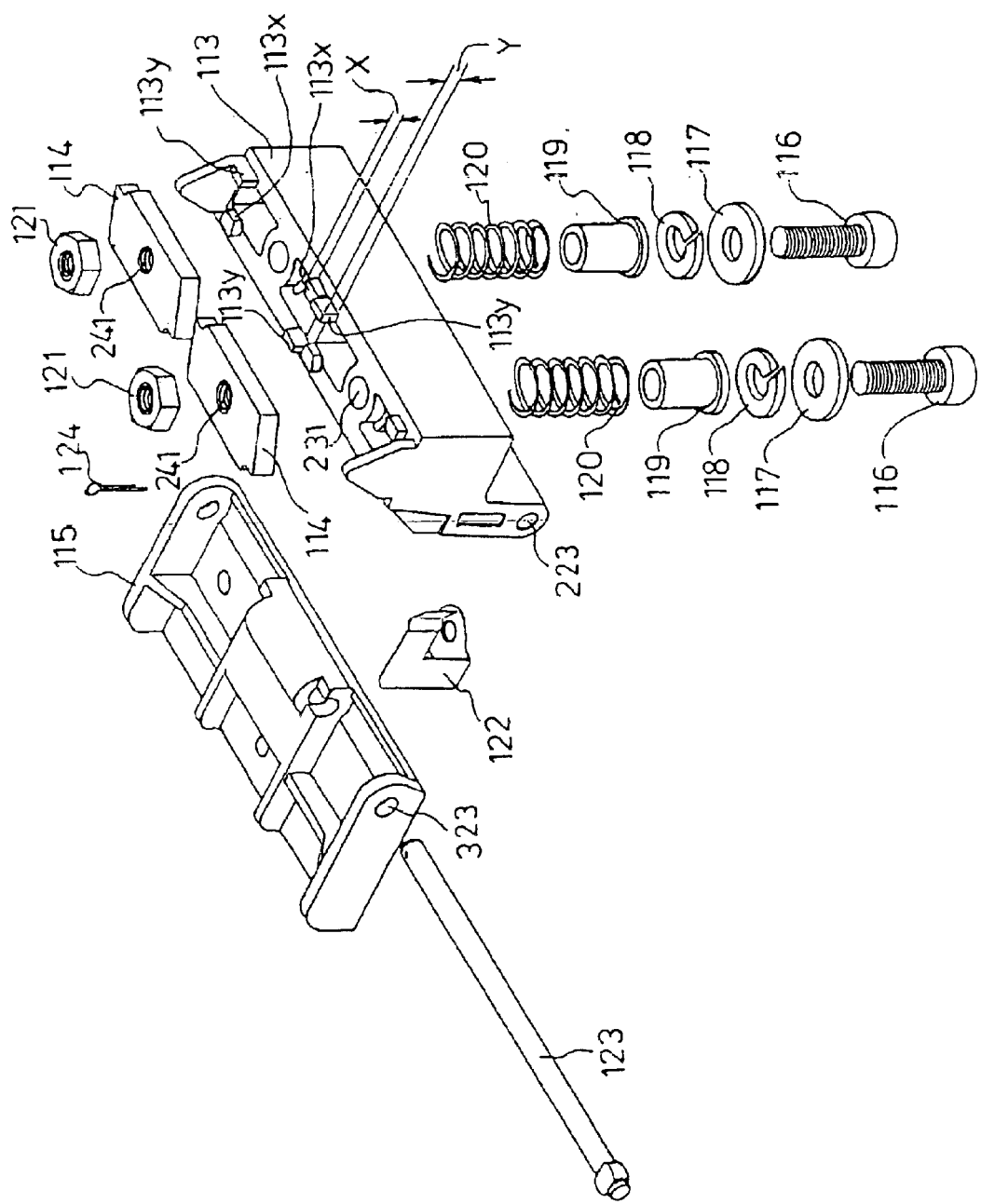
FIG. 6 is an exploded perspective view showing the fixture device in accordance with the second embodiment of the present invention.
Figure 8:
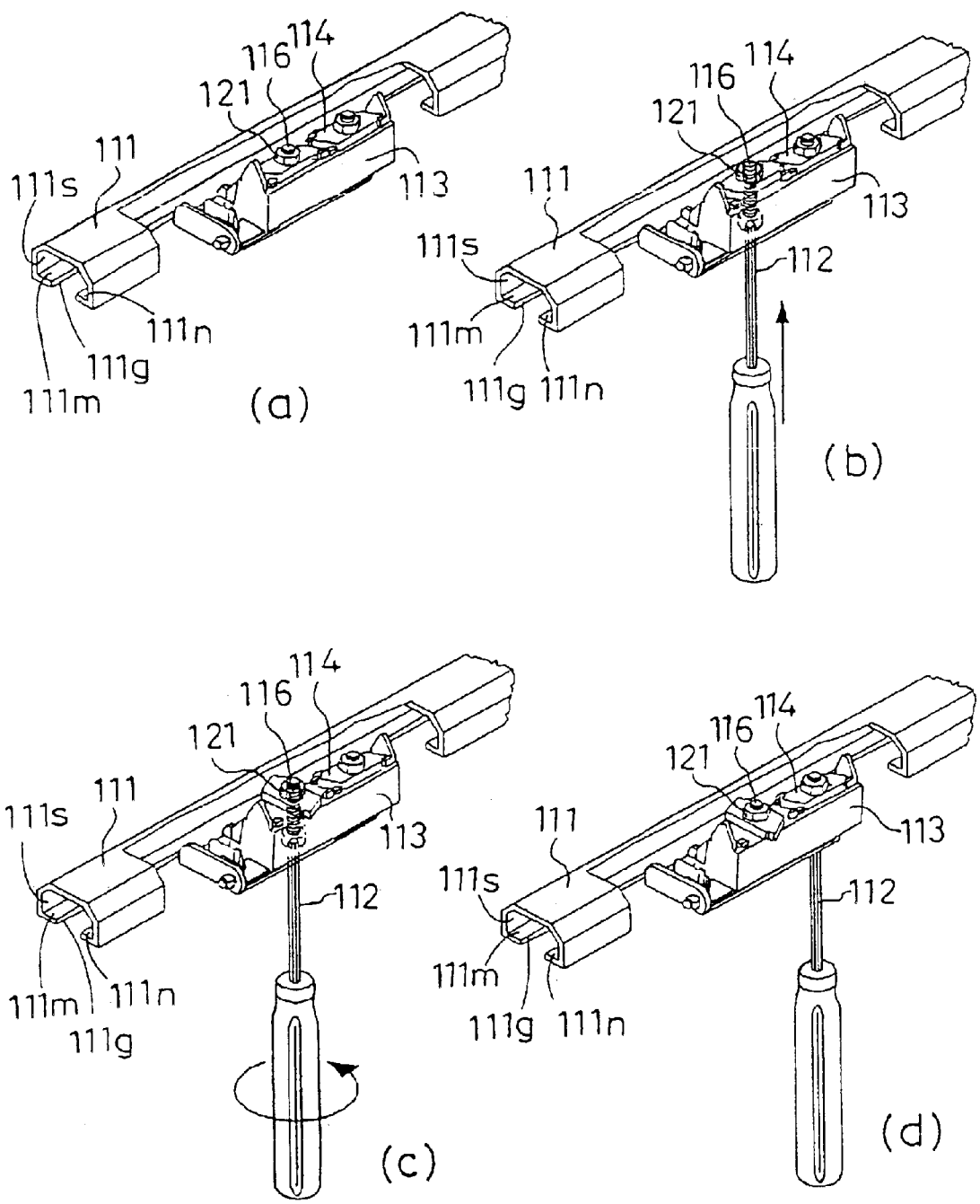
FIGS. 8(a), (b), (c) and (d) are perspective views showing the installation steps of the fixture device in accordance with the above-mentioned second embodiment.
Figure 9:
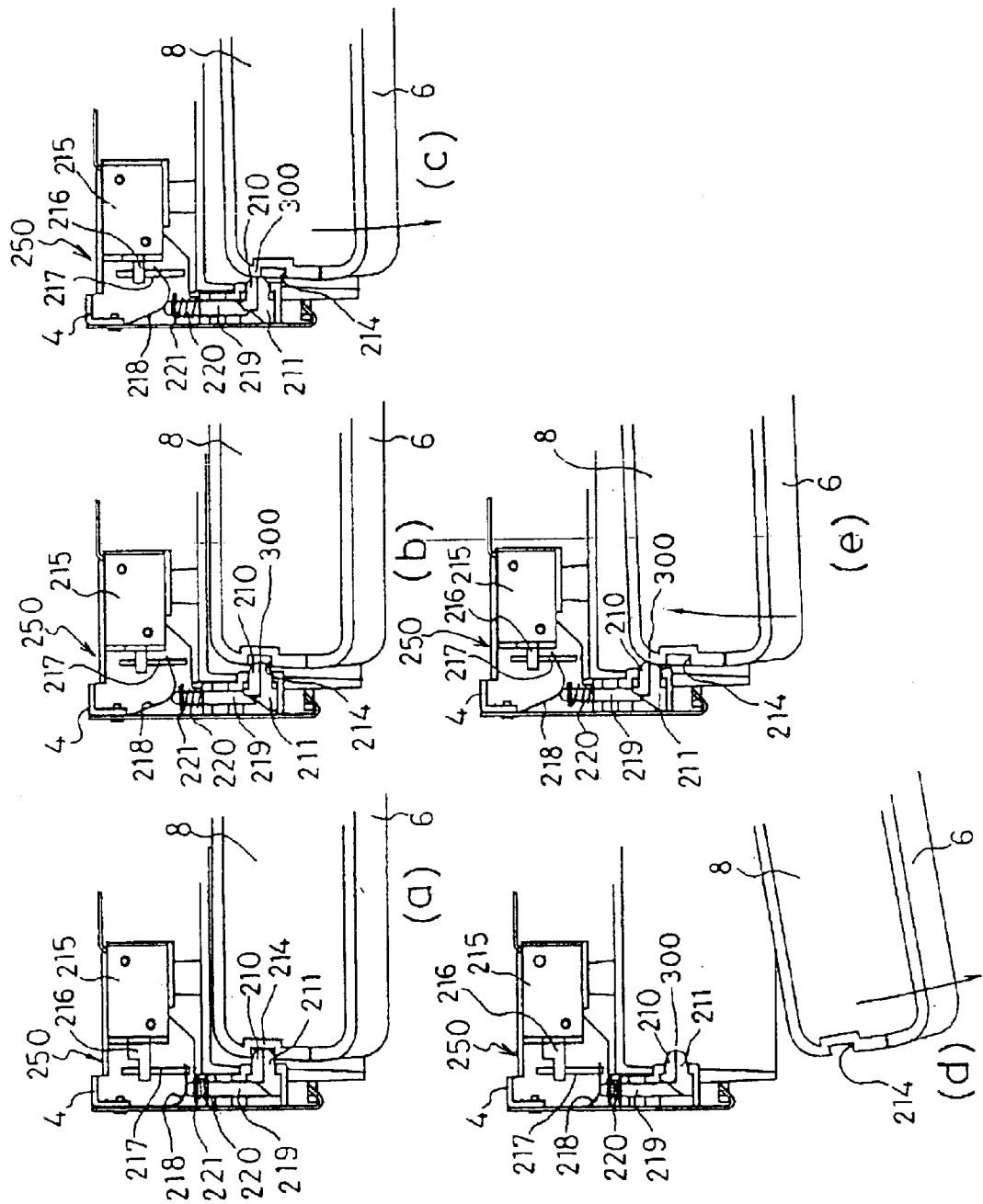
FIGS. 9(a), (b), (c), (d) and (e) are partially sectional views showing the display apparatus body and the display section provided with a latch device in accordance with a third embodiment of the present invention.
Figure 21:
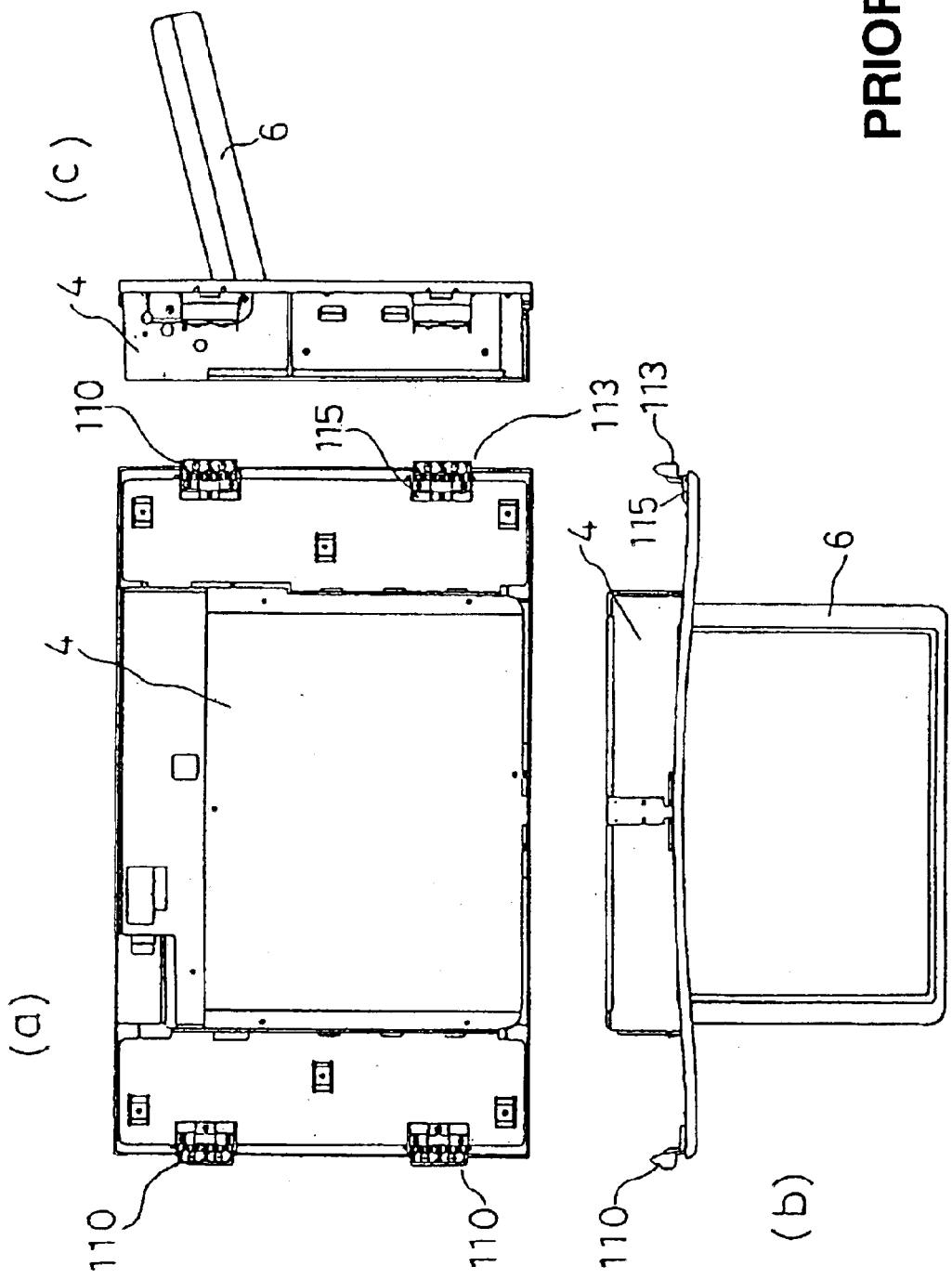
FIGS. 21(a), (b) and (c) are a bottom view, a front view and a side view, respectively, showing the display apparatus installed in the ceiling of the cabin.
Figure 22:
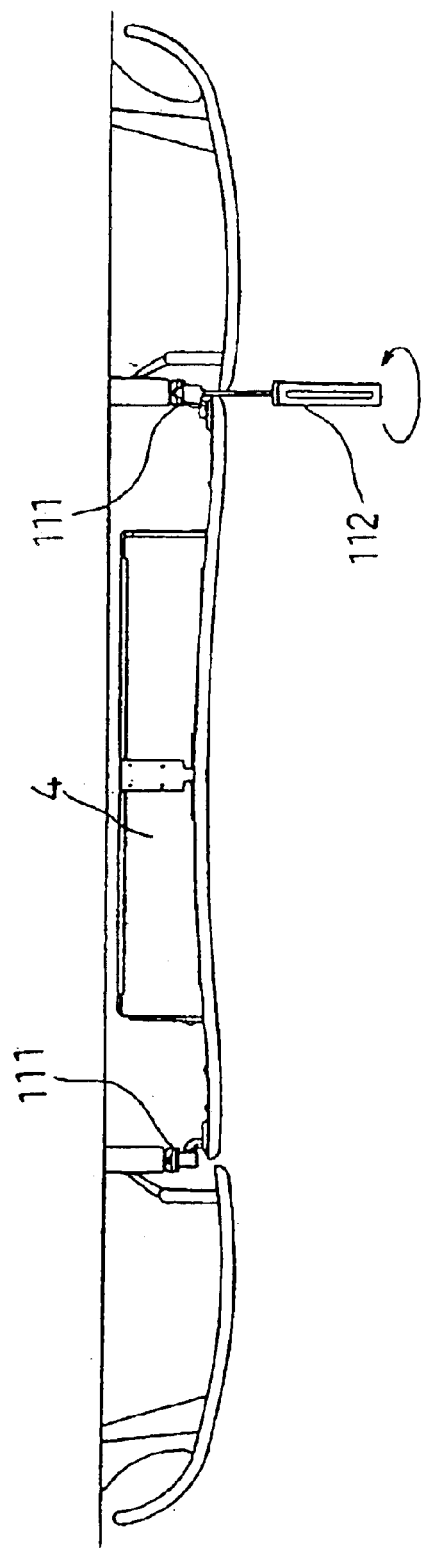
FIG. 22 is a cross sectional view showing the ceiling portion of the cabin.
Figure 23:
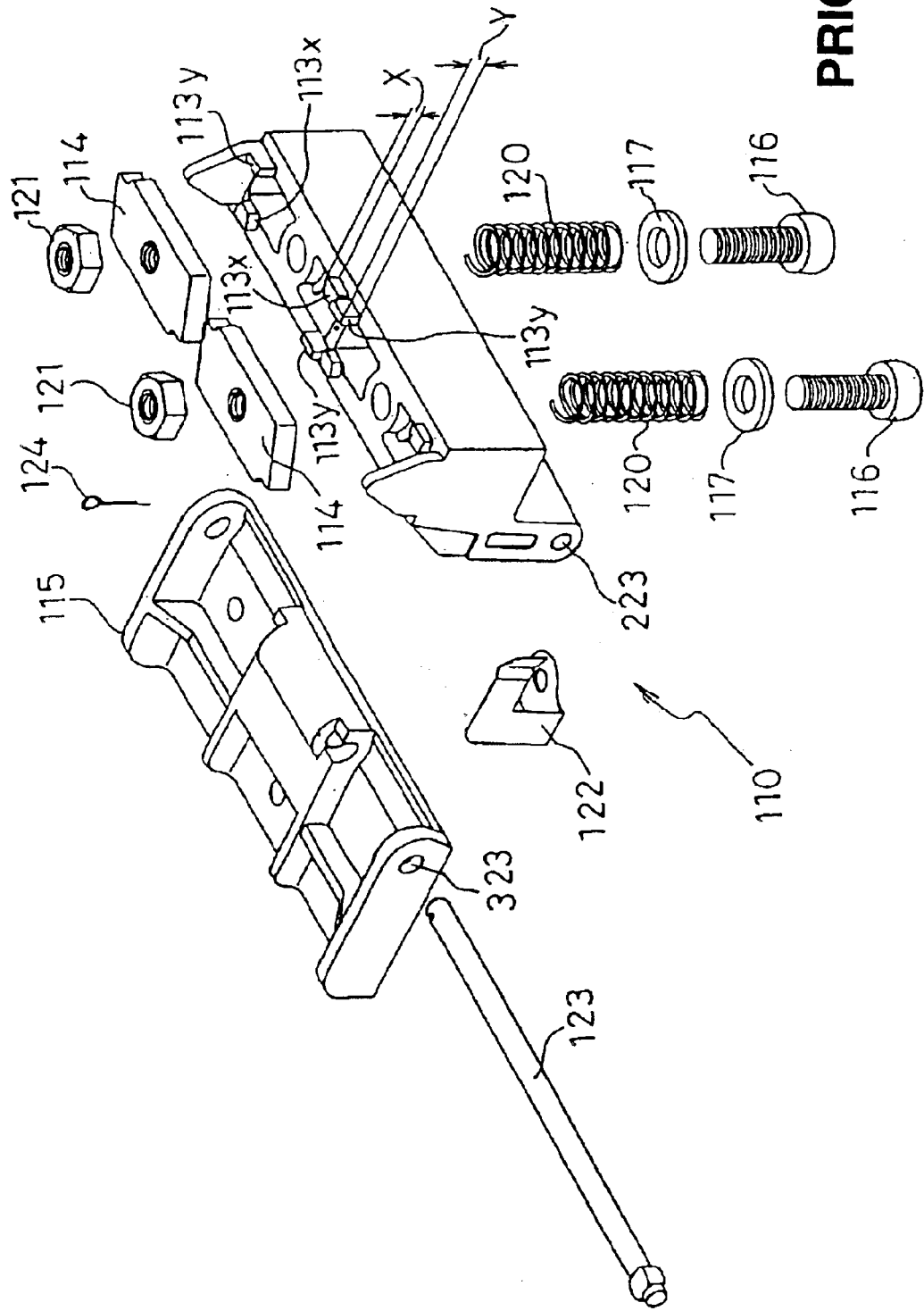
FIG. 23 is an exploded perspective view showing the components of the conventional fixture device.
Figure 24:
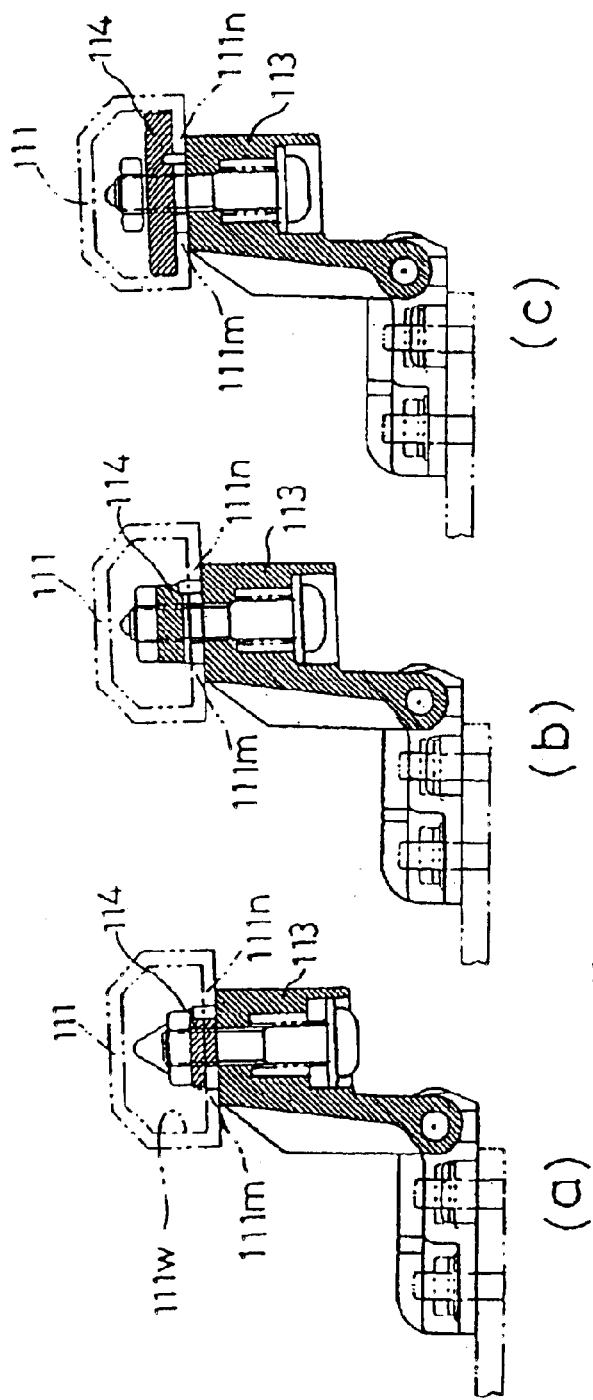
FIGS. 24(a), (b), (c) and (d) are sectional views showing the operation steps for the conventional fixture device.
Figure 26:
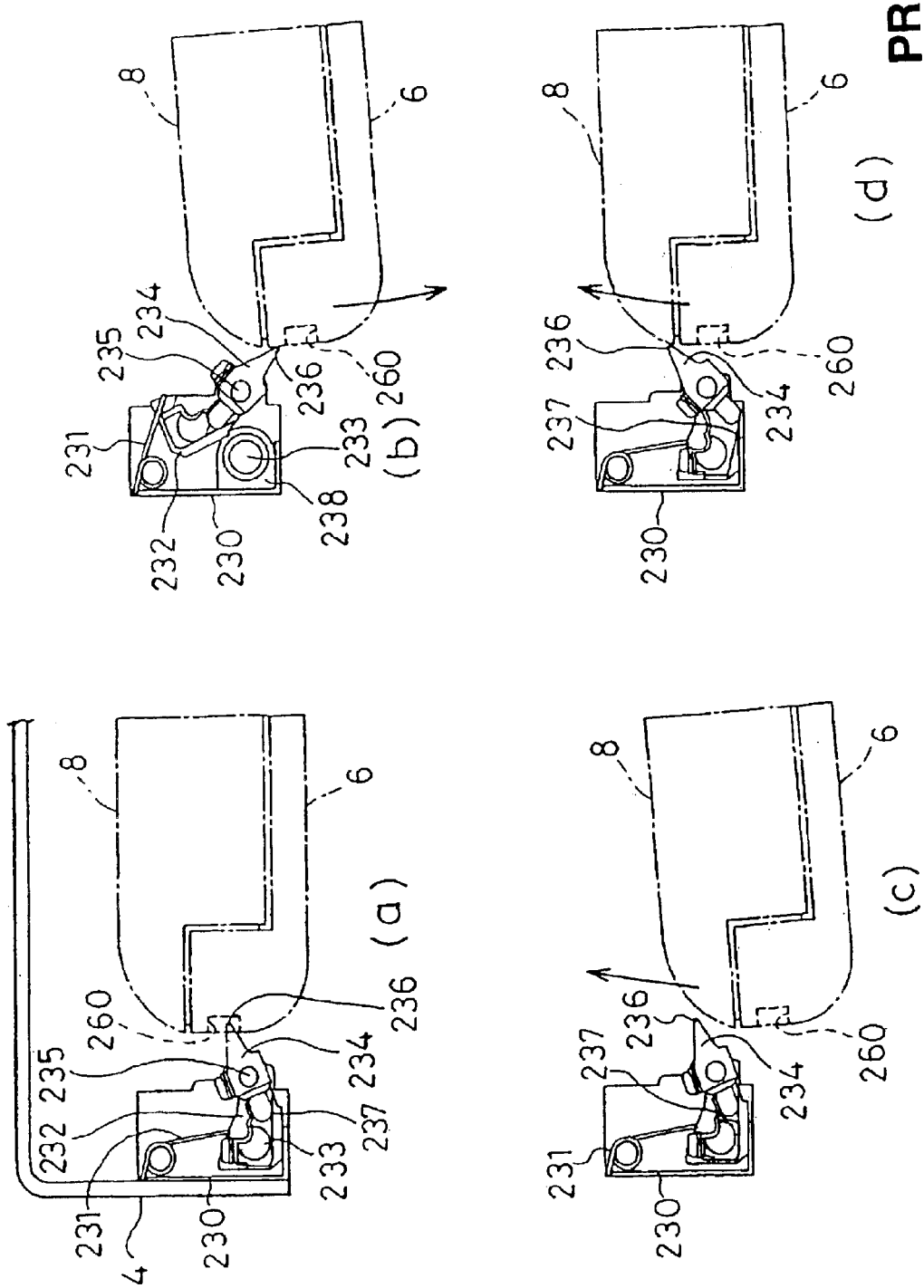
FIGS. 26(a), (b) (c) and (d) are partial side views showing the operation of the conventional latch device.

Hereafter, the present embodiment will be described referring to FIG. 5 to FIG. 8. FIG. 14 and FIG. 22 are also used in this explanation. FIG. 14 shows the ceiling portion of a passenger aircraft and the display apparatus body 4 disposed therein. FIG. 21 is a view showing the fixture positions of the fixture devices on the display apparatus. FIG. 22 shows a state wherein the display apparatus shown in FIG. 21 is fixed to the ceiling portion. FIG. 5 is a perspective view showing the fixture device in accordance with this embodiment of the present invention. FIG. 6 is an exploded perspective view showing the components configuration of the fixture device shown in FIG. 5. FIGS. 7(a) to (d) are views showing the sequence of the installation operations of the device in this embodiment. FIGS. 8(a) to (d) are perspective views showing the sequence of the operations in FIGS. 7(a) to (d).

Although the block 113 and the like of the fixture device in accordance with this embodiment appear similar to those of the conventional fixture device in their external appearances, their main structures will be described below. The nut plate 114 has a threaded hole 241 having an internal thread in the center thereof. The tip portion of the hexagonal socket head bolt 116 passing through a washer 117, a spring washer 118 having a predetermined compression deformation amount and placed thereon, a sleeve 119 having a predetermined length and placed thereon, and the flexible coil spring 120 outside the sleeve 119 are screwed into the threaded hole 241 in the nut plate 114. Above the nut plate 114, the nut 121 is screwed and bonded to the tip of the bolt 116. The nut plate 114 is disposed between the lower rib (a small protrusion) 113x of a height X and the higher rib 113y of a height Y on the upper face of the block 113. The following relationships are selected among the height X of the rib 113x, the height Y of the rib 113y and the thickness D (FIG. 7) (hereafter simply referred to as the thickness of the rail 111) of the rack portions 111m and 111n of the rail 111. In other words, the relationships are as follows: [the height X]≦[the thickness D of the rail 111] and [the height X]<[the height Y].

At this time, as shown in FIGS. 8(b) and (c), the nut 121 is turned when the bar wrench 112 having a hexagonal cross-section is inserted into the hexagonal hole in the bolt 116 and raised and turned clockwise, and the nut plate 114 passes the rib 113x (FIG. 6), having the height X, of the block 113 and turns clockwise. However, the nut plate 114 is fixed to the bolt 116 so as to have a height making contact with the rib 113y, having the height Y, of the block 113 and thereby not turning when the wrench 112 is turned counterclockwise. The block 113 is connected to the base 115 by a through shaft 123, and the through shaft 123 is fixed by the split pin 124 inserted into the rear (right) end thereof.

In this configuration, the wrench 112 is inserted into the hole in the bolt 116 and turned clockwise about 90° (substantially 90°) while the wrench 112 is raised. At this time, the nut plate 114 passes over the rib 113x having the height X of the block 113 and turns clockwise. Both end portions thereof make contact with the inner walls 111w of the frame-shaped rail 111 in cross-section (FIG. 7 and FIG. 8) and then stop. The eight nut plates in the display apparatus 4 are set in this state. However, when the bolts are loosened slightly instead of being tightened completely, the display apparatus 4 can be moved slightly along the rail 111, whereby positional adjustment is made possible.

By tightening the bolts 116 completely as shown in FIG. 7(c) and FIG. 8(c), this fixture device 110 is fixed to the rail 111. By completely fastening the nut plates 114 at all the eight positions in a similar way, the display apparatus 4 can be fixed completely to the rails 111 on the aircraft body in the ceiling portion. When removing the display apparatus 4, the nut plate 114 is released by turning the bolt 116 counterclockwise, thereby releasing the friction force with the rack-shaped portions 111m and 111n of the rail 111.

In FIG. 6, the nut plate 114 is turned counterclockwise as the bolt 116 is turned and makes contact with the higher rib on the upper face of the block 113, that is, the rib 113y having the height Y. In this state, the bolt 116 is turned counterclockwise until the nut plate 114 is raised by the bolt 116 to a position making contact with the nut 121. As a result, as shown in FIG. 7(d), the nut plate 114 is moved beyond the rib 113y and becomes parallel with the opening groove 111g of the rail 111. By a similar operation, all the eight nut plates 114 are turned counterclockwise. Hence, all the eight nut plates 114 become parallel with the opening grooves 111g, whereby the display apparatus 4 can be removed from the rails 111 on the aircraft body in the ceiling portion.

In FIG. 7(d) and FIG. 8(d), when the wrench 112 is turned clockwise while pushing the bolt 116 upward, if the nut plate 114 is insufficiently raised, the nut plate 114 will not pass over the rib 113x, having the height X, of the block 113. Therefore, the nut plate 114 does not rotate and does not become perpendicular to the opening groove 111g. (This also occurs when the nut plate 114 is rotated from a position other than its original position.) If fastening is carried out when the nut plate 114 is present between the rib 113x and the rib 113y of the block 113, having the height X and the height Y, respectively, or, in other words, when the nut plate 114 is parallel with the opening groove 111g (if the fastening is carried out at an improper position) as described above, the nut plate 114 is only fastened to the upper face of the block 113 as shown in FIG. 7(d) and is not fastened to the rack-shaped portions 111m and 111n of the rail 111.

In the present embodiment, the length of the firmly fastened integration, comprising the head (the flange-shaped portion at the lower end in FIG. 6) of the tightened bolt 116, the washer 117, the spring washer 118, the sleeve 119, and the nut plate 114, is longer than the depth of a loose-fitting hole 113u for inserting the bolt of the block 113.

In FIG. 7(d), the diameter of the loose-fitting hole 113u in which the bolt and the coil spring are inserted is larger than the diameter of the sleeve 119 except proximate the upper face of the block 113, whereby the sleeve 119 can move freely inside the loose-fitting hole 113u. The diameter of the spring washer is selected so that the spring washer 118 can be inserted in the lower portion of the loose-fitting hole 113u. In FIG. 7(d), since the nut plate 114 does not project up to the upper faces of the rack-shaped portions 111m and 111n of the rail 111, the lower face of the nut plate 114 does not rise from the upper face of the block 113 to a level to contact with the rack-shaped portions 111m and 111n.

Hence, in this case, a clearance exists between the upper face of the nut plate 114 and the lower portion of the nut 121. Furthermore, a clearance Z exists between the upper face of the washer 117 and the lower end of the loose-fitting hole 113u as shown in FIG. 7(d). Therefore, when the wrench 112 is pushed up, the bolt 116 and the washer 117 are lifted while compressing the coil spring 120. However, when the pushing force of the wrench 112 is released, the bolt 116 is pushed back downward by the recovery force of the coil spring 120.

The relationship between the above-mentioned clearance Z and the dimension of each part and the actions thereof are described below.

(a) A condition wherein the bolt 116 is tightened sufficiently and properly:

[The thicknesses of the rack-shaped portions 111m and 111n of the rail 111]≧[The entire length of the sleeve 119+ the thickness of the flat washer 117+ the compressed thickness of the spring washer 118 reduced from that in the free state thereof] Furthermore, as shown in FIG. 7(d), (b) When constant play (clearance Z) occurs after improper and/or insufficient tightening, the dimension of the clearance Z is:

[The entire length of the sleeve 119+ the thickness of the flat washer 117+ the thickness of the compressed and flattened spring washer 118]−[the thickness of the block 113]=the clearance Z The above-mentioned relationships (a) and (b) are arranged as follows:

[The thickness D of the rack-shaped portions 111m and 111n of the rail 111]>the clearance Z Since the clearance Z is formed by the above-mentioned configuration, when the wrench 112 is moved up and down by increasing or decreasing the upward pushing force, the flange face of the head of the bolt 116 strikes the step portion 113d of the block 113, thereby causing rattling that can be heard and vibrations that can be felt. From this, it is understood that both end portions of the nut plate 114 are improperly coupled to the rack-shaped portions 111m and 111n of the rail 111. In other words, the rattle heard and the vibrations felt, which occur when the washer 117 makes contact with the lower step portion 113d of the loose-fitting hole 113u of the block 114 because of the up-down movement of the bolt 116 from the deformations of the spring washer 118 and the coil spring 120, are used as a means for indicating improper installation.

The spring washer 118 is used in the above-mentioned configuration to reliably turn the nut plate 114 substantially 90° by rotating the bolt 116 while pushing it up. As described above and as shown in FIG. 7(d), in the present invention, play, that is, the clearance Z, is formed between the head (in reality, the washer 117 disposed just above it) of the bolt 116 and the lower face (in reality, the lower step portion 113d of the loose-fitting hole u) of the block 113. To form this clearance Z, a loose-fitting cylinder having a predetermined length, that is, the sleeve 119, is loosely fitted between the coil spring 120 and the bolt 116. In this case, as shown in FIG. 7(b), in a state wherein the bolt 116 is gently pushed up by using the wrench 112 or the like, the upper end of the sleeve 119 does not yet reach the lower face of the nut plate 114. In other words, when the bolt is just pushed up with a gentle force, the sleeve 119 does not contact the nut plate 114, as shown in FIG. 7(b). If the sleeve 119 does not contact the nut plate 114 and the bolt 116 is pushed up and rotated, the nut plate 114 slides with respect to the bolt 116 and is not rotated accurately (the nut plate 114 remains even if the bolt 116 is rotated). However, when the spring washer 118, having a predetermined compressive elastic force, is provided and the bolt 116 is pushed up by the predetermined compressive force to compress the spring washer 118, as in the present invention, the nut plate 114 and the sleeve 119 are kept in contact by virtue of the upward pushing force. Consequently, friction increases between the nut plate 114 and the sleeve 119 and between the nut plate 114 and the bolt 118 connected thereto. For this reason, when the bolt 116 is pushed up and rotated, the nut plate 114 is turned securely without slipping.

In the above description, an example configured by using the spring washer 118 is described. However, even when a wire spring is used instead of this, this embodiment is realizable. Furthermore, even when only a wire spring is used instead of the configuration of the spring washer and the sleeve, this embodiment is realizable.

<<Third Embodiment>>

A latch device in accordance with a third embodiment of the present invention will be described referring to FIG. 9 to FIG. 13.

The latch device described in this embodiment is disposed in the ceiling portion of a passenger aircraft and is used for a display apparatus for displaying video images. Therefore, since the latch device in accordance with this embodiment is used in a situation similar to that of the above-mentioned conventional display apparatus shown in FIG. 14, the latch device in accordance with this embodiment will be described referring to the reference numerals for the display apparatus used in FIG. 14.

As shown in FIG. 14, the display apparatus 3 is arranged in the lower portion of the baggage rack 5 in the ceiling portion 2 of the passenger aircraft, and comprises the display apparatus body 4, the display section 6 is configured to be retractable into the display apparatus body 4, and the open/close operation section 7 is used for opening/closing this display section 6. The display section 6 is provided with the display member 8, such as an LCD (liquid crystal display), serving as a flat panel display means. The display member 8 is supported at the most suitable angle.

FIGS. 9(a) to (e) are sectional views illustrating the engagement operation between the display apparatus body 4 provided with a latch device 250 in accordance with this embodiment and the display section 6 retracted into the display apparatus body 4. The latch device 250 in accordance with this embodiment is disposed on the display apparatus body 4, and is configured so that a latch section 300 having an upper latch 210 and a lower latch 211 is fitted into a recessed hole 214 formed on a side face of the retractable display section 6. As shown in FIG. 9(a), inside the display apparatus body 4, a plunger 215 is disposed above the display member 8 of the retracted display section 6. An actuator 216 serving as the drive shaft of this plunger 215 is driven in the leftward and rightward directions of the figure. When the plunger 215 is energized, the actuator 216 is moved rightward. As this actuator 216 is moved, a slide shaft 219 is configured to move up and down via a plate spring 218. FIG. 9(a) shows a state wherein the slide shaft 219 is pushed by the plate spring 218 and is moved downward. FIG. 9(b) shows a state wherein the plate spring 218 is no longer pushing the slide shaft 219 and the slide shaft 219 is pushed up by a coil spring 220. The coil spring 220 is provided between the rim 21 of the slide shaft 219 and the frame of the display apparatus body 4 and biases the slide shaft 219 upwardly at all times.

Figure 10:
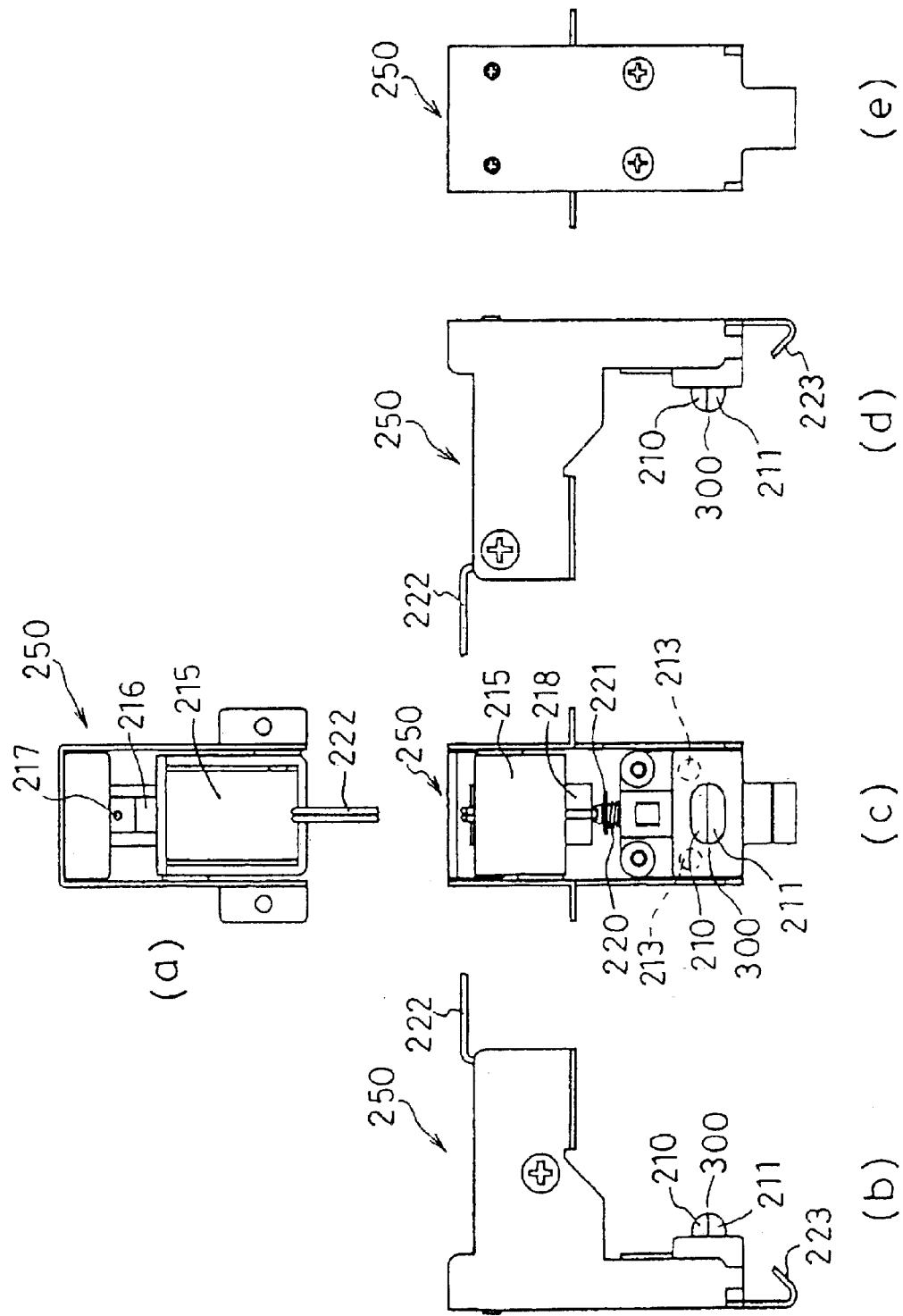
FIG. 10(a) is a plan view showing the latch device in accordance with the third embodiment.
FIG. 10(b) is a right side view.
FIG. 10(c) is a front view.
FIG. 10(d) is a left side view.
FIG. 10(e) is a rear view.
Figure 12:
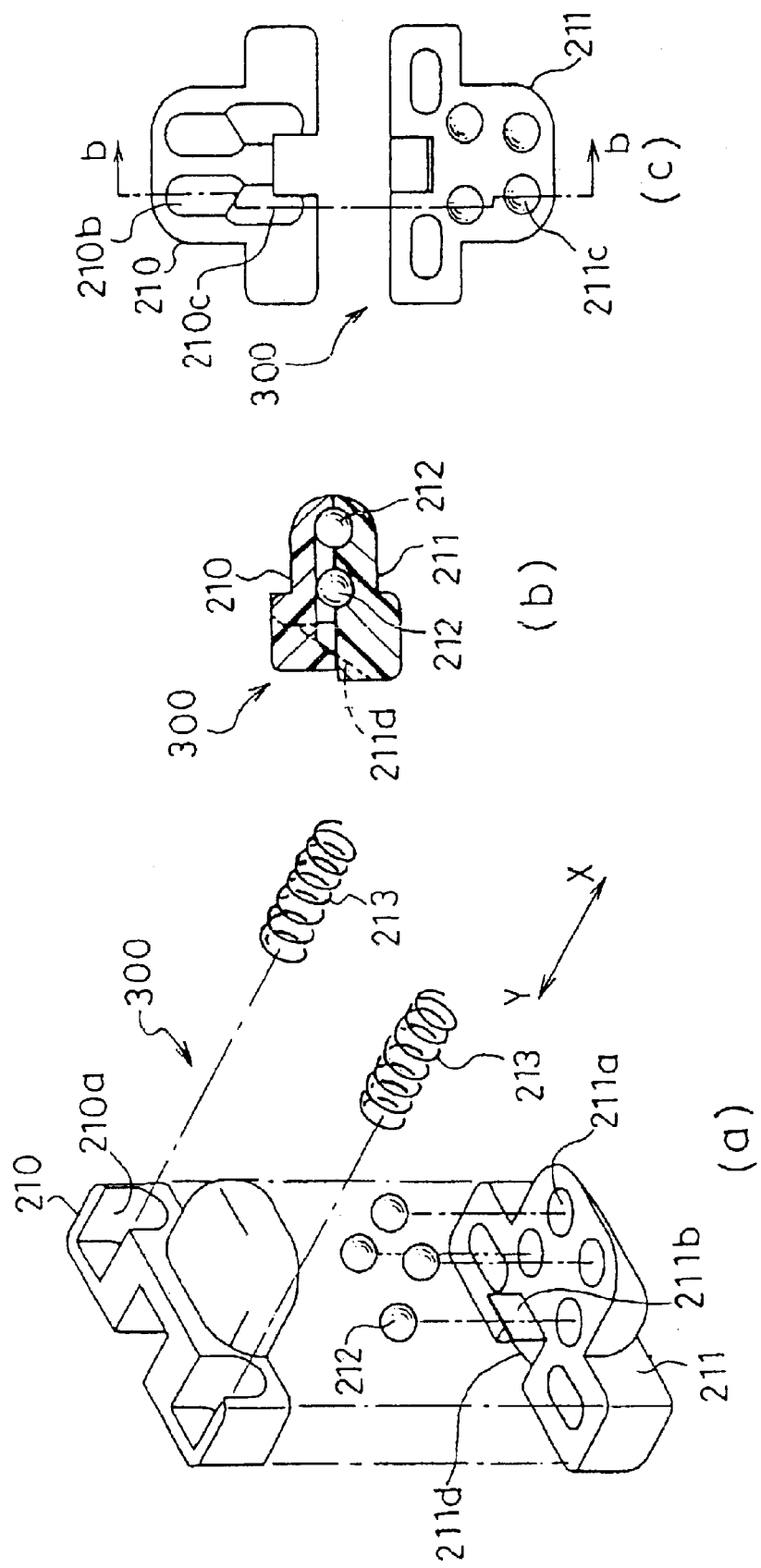
FIG. 12(a) is an exploded perspective view showing the upper latch, lower latch, balls and latch springs of the latch device in accordance with the third embodiment.
FIG. 12(b) is a sectional view.
FIG. 12(c) is a plan view of opposed faces of the upper latch and the lower latch.

FIG. 10 is a view showing the latch device 250 provided for the display apparatus body 4, wherein (a) is a plan view, (b) is a left view, (c) is a front view, (d) is a right view, and (e) is a rear view. FIG. 11 is a side view of the internal mechanism of the latch device shown in FIG. 10, wherein (a) shows a state wherein the actuator 216 is moved leftward and (b) shows a state wherein the plunger 215 is energized and the actuator 216 is moved rightward.

As shown in FIG. 10 and FIG. 11, one end of the plate spring 218 is fixed to the frame of the display apparatus body 4, and the other end slidably engages an arm 217 attached nearly perpendicular to the tip of the actuator 216. Therefore, with the leftward and rightward movements of the actuator 216, the plate spring 218 presses the upper end of the slide shaft 219 and drives it upwardly and downwardly. In FIG. 10, open/close signals are sent from the open/close operation portion 7 to the plunger 215 via a signal cable 222. Furthermore, a hook 223 provided at the lower end of the latch device 250 engages the frame of the display apparatus body 4 to facilitate positioning thereof.

FIG. 12(a) is an exploded perspective view of the latch section 300. The latch section 300 comprises the upper latch 210, the lower latch 211, four balls 212, and two latch springs 213. FIG. 12(b) is a sectional view showing the latch section 300, and (c) is a plan view showing the shapes of the opposed faces of the upper latch 210 and the lower latch 211. FIG. 12(b) is a sectional view taken along the line B—B of the plan view in (c).

As shown in FIG. 12(a), in the latch section 300, the upper latch 210 is attached to the lower latch 211 with the balls (steel balls) 212 held therebetween. Projection sections are formed on the upper latch 210 and the lower latch 211 to fit into the recessed hole 214 in the display section 6. A protrusion 211b is formed to protrude from a face of the lower latch 211 opposed to the upper latch 210. The lower latch 211 and the upper latch 210 are positioned with respect to each other using the protrusion 211b. Furthermore, holes for holding the balls 212 are formed on the mutually opposed faces (see FIG. 12(c)) of the projection sections of the upper latch 210 and the lower latch 211. As shown in FIG. 12(c), four round holes 211c, for fixing and holding the balls 212, are formed in the lower latch 211. Slots 210c are formed in the upper latch 210 to hold the balls 212 so that the balls 212 are movable parallel to the projection direction (the X direction in FIG. 12(a)) of the projection section by a predetermined distance (about 0.5 mm). Furthermore, the upper latch 210 is pressed at all times by the latch springs 213 in a direction (the Y direction in FIG. 12(a)) opposite to the projection direction.

Since the latch section 300 is configured as described above, when only the upper latch 210 is pressed and moved in the Y direction (FIG. 12(a)), the lower latch 211 connected thereto via the balls 212 also moves simultaneously in the same direction. On the contrary, when only the lower latch 211 is pressed and moved in the Y direction, the upper latch 210 starts moving only after the lower latch 211 has moved by about 0.5 mm.

An inclined face 211d is formed on the rear side of the latch section 300 to contact the lower end of the slide shaft 219 at all times. The lower end of the slide shaft 219 is formed to have an inclined face to make face-to-face contact with the inclined face 211d of the latch section 300.

Next, the operation of the latch device 250, having the latch section 300 configured as described above, will be described referring to FIGS. 9(a) to (e).

FIG. 9(a) is a state wherein the display section 6 is retracted into the display apparatus body 4, and the upper latch 210 and the lower latch 211 are fitted into the recessed hole 214 of the display section 6. At this time, the plate spring 218 presses the slide shaft 219 downwardly by virtue of the arm 217, the tip of the slide shaft 219 presses the inclined face portion of the lower latch 211, and the upper latch 210 makes contact with the side face of the slide shaft 219. As a result, even when the latch section 300 is pressed by the display section 6, no retraction operation is performed, and the display section 6 does not perform the opening operation by which the display section 6 is rotated with respect to the display apparatus body 4 to open the display section 6.

FIG. 9(b) shows an initial state for performing the opening operation by which the display section 6 is rotated with respect to the display apparatus body 4 and is opened. When the display section 6 is subjected to the opening operation, the plunger 215 is energized by an opening command from a microcomputer outside the apparatus, and the actuator 216 is moved rightwardly, as shown in FIG. 9(b). The plate spring 218 is pulled rightwardly by the movement of the actuator 216, thereby releasing the restriction of the movement of the slide shaft 219. Hence, the slide shaft 219 is moved upwardly by the elastic force of the coil spring 220. As a result, the inclined face portion of the upper latch 210 makes contact with the tip of the slide shaft 219, whereby the upper latch 210 is pushed by the latch spring 213 and moves leftwardly in FIG. 9(b). At this time, the lower latch 211 also moves by the same distance. Hence, the projection distance of the projection section of the latch section 300 is decreased.

The state shown by FIG. 9(c) is a state wherein the display section 6 has turned with respect to the display apparatus body 4 from the state shown in FIG. 9(b). In this state, when the display section 6 is subjected to the opening operation, the upper latch 210 and the lower latch 211 are pushed by the display section 6 and moved leftward further. At this time, since the upper latch 210 makes contact with the inclined face of the tip of the slide shaft 219, the slide shaft 219 is lifted upwardly by the leftward movement of the upper latch 210. At this time, since the upper end of the slide shaft 219 makes contact with the plate spring 218 that is in a bendable state, the slide shaft 219 upwardly movable. In this state, the lower latch 211 is able to be moved leftward with respect to the upper latch 210.

FIG. 9(d) shows a state wherein the display section 6 has turned further from the state in FIG. 9(c) and is completely separated from the latch section 300. At this time, no direct current flows to the plunger 215, and the actuator 216 has returned to its original position (the state shown in FIG. 9(a)). As a result, the slide shaft 219 is pushed down by the plate spring 218, and the upper latch 210 and the lower latch 211 return to their original positions.

FIG. 9(e) shows a state wherein the display section 6 is retracted into the display apparatus body 4, and the display section 6 makes contact with the lower latch 211. At this time, the lower latch 211 is pressed by the display section 6 and moved leftwardly. At this time, since the lower latch 211 makes contact with the inclined face of the tip of the slide shaft 219, the slide shaft 219 is lifted upwardly and the plate spring 218 is lifted upwardly. Since the rotation force at the time when the display section 6 is retracted is sufficiently larger than a load at the time when the display section 6 is displaced because of shocks or the like, the upper latch 210 is also moved leftwardly.

In the above-mentioned retraction operation, the lower latch 211 initially moves because of the contact between the display section 6 and the latch section 300. After the lower latch has moved about 0.5 mm, the slide shaft 219 is pushed upwardly, and the inclined face of the tip of the slide shaft 219 makes contact with the inclined face portion of the upper latch 210. Since the upper latch 210 makes contact with the inclined face of slide shaft 219, as described above, when the lower latch 211 is moving, the upper latch 210 starts moving leftward via the balls 212. The upper latch 210 and the lower latch 211, moving in this way, are returned to their original positions by the elastic force of the plate spring 218 when they are fitted into the recessed hole 214 in the display section 6, whereby the display section 6 is securely held in the display apparatus body 4.

Figure 13:
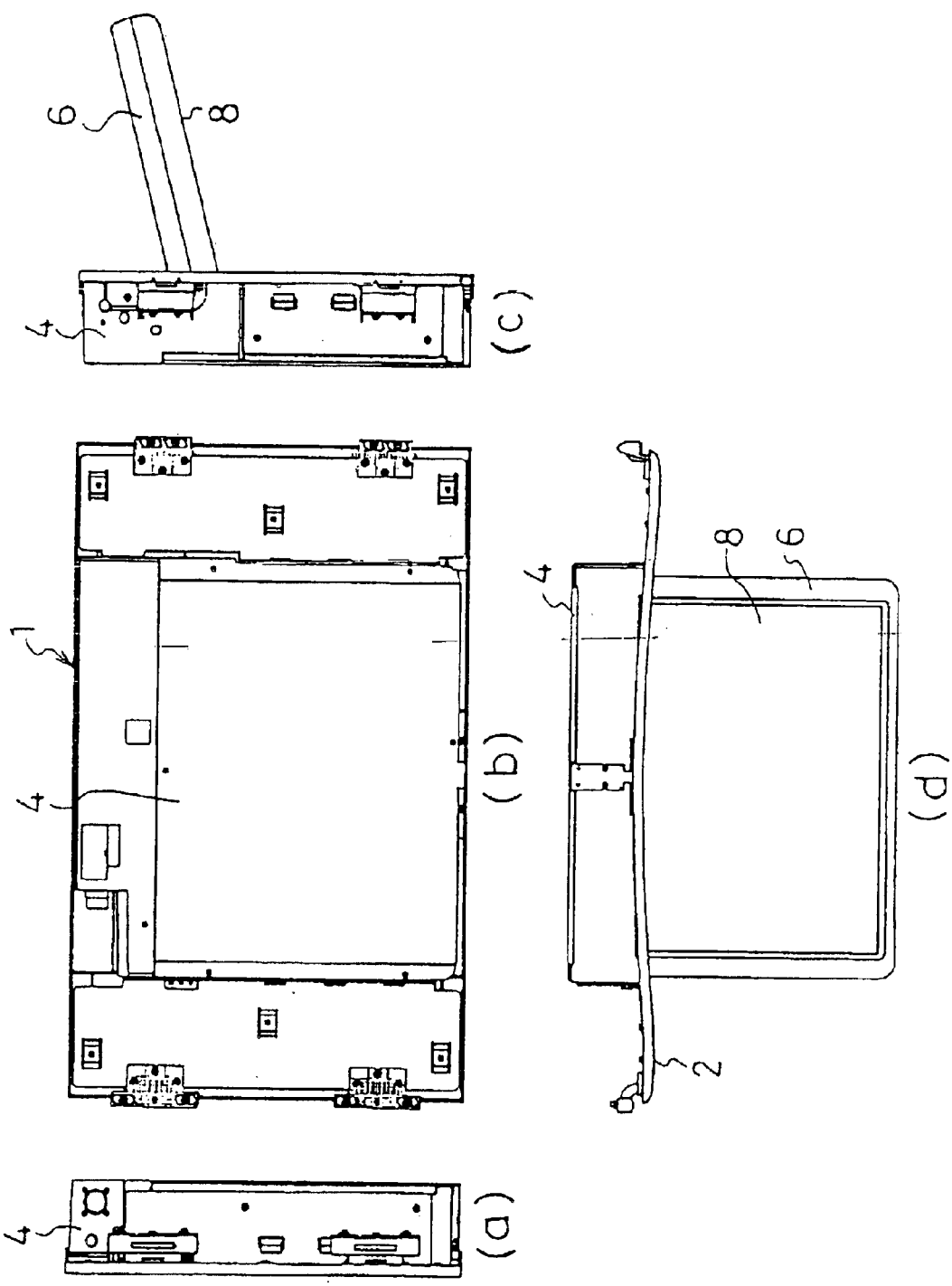
FIG. 13(a) is a left side view showing a state wherein the latch device in accordance with the third embodiment is installed on the display apparatus.
FIG. 13(b) is a plan view.
FIG. 13(c) is a right side view of the opened display section.
FIG. 13(d) is a front view of the opened display section.

FIG. 13 is a view showing a state wherein the latch device in accordance with this embodiment is built in the display apparatus body 4, wherein (a) is a left side view, (b) is a plan view, (c) is a right side view showing a state wherein the display section 6 is opened, and (d) is a front view showing a state wherein the display section 6 is opened.

As described above, in the latch device in accordance with this embodiment, the slide shaft 219 and the actuator 216 of the plunger 215 are disposed in the shape of an L. In this way, it is possible to prevent the apparatus from becoming larger in size because of the mounting of the latch device, and a compact apparatus is achieved.

INDUSTRIAL APPLICABILITY

As described above in detail in each embodiment, in accordance with the present invention, by inserting the projection plates of the fixture blocks at the left end portion of the display apparatus body into the installation windows in the left blocks attached on the rail, the fixture blocks are fixed to the left block. Therefore, the display apparatus body will not fall even when a worker releases his hands from the display apparatus body. In this way, the worker can carry out necessary cable connection work with both of his free hands. After the completion of the cable connection work, the worker lifts the right end portion of the display apparatus body and fixes the right blocks to the rail. Since these steps of work can be carried out by one worker, the cost of labor for the installation is reduced.

In the fixture device in accordance with the present invention, when the nut plate does not pass the rib of the height X of the block but is present between the rib of the height X and the rib of the height Y (in other words, when it is in a state of being fastened at an improper position), the bolt moves up and down and rattles when pushed with a wrench or the like. Because of this, it is possible to detect that the fixture is improperly installed. Hence, the heavy display apparatus can be fixed securely to the ceiling portion of the vehicle, thereby enhancing safety and reliability thereof.

In the latch device in the present invention, in the state wherein the display section is retracted into the display apparatus body, the display section and the display apparatus body are fitted securely, whereby rattles due to vibration, shocks, etc. are not caused.

Furthermore, in accordance with the present invention, the latch device is configured in the shape of an L, whereby the depth of the display apparatus body provided with the latch device can be reduced.

Still further, since the latch device in accordance with the present invention comprises reduced number of components and the shapes of components are simple in comparison with a conventional device, it is easier and less costly to produce than the conventional latch device.

What is claimed is:

1. A fixture device for installing a display apparatus comprising:

a block for installation, to be fixed to a rail provided in a ceiling portion of a vehicle, having an installation window in a side portion and a latch hole in the installation window, and a fixture block adapted to be installed on a display apparatus body, the fixture block including an arm having a projection section to be inserted into said installation window, a base plate adapted to be fixed to said display apparatus and rotatably connected to said arm, and a release lever having a cut-and-raised portion serving as a latch that enters said latch hole in the installation window and prevents said projection section from separating from the installation window when said projection section is inserted into the installation window.

2. A fixture device in accordance with claim 1, wherein said release lever has a bent portion to which an operation force for separating the cut-and-raised portion having entered said latch hole from the latch hole is applied.

3. A fixture device in accordance with claim 1, characterized in that the width of said latch hole is made wider than the cut-and-raised portion so that the cut-and-raised portion having entered said latch hole is movable.

* * * * *